United States Patent
Iwasaki et al.

(10) Patent No.: US 10,199,636 B2
(45) Date of Patent: Feb. 5, 2019

(54) ELECTRODE, NONAQUEOUS ELECTROLYTE BATTERY, BATTERY PACK, AUTOMOBILE, AND VEHICLE

(71) Applicant: Kabushiki Kaisha Toshiba, Minato-ku (JP)

(72) Inventors: Takuya Iwasaki, Uenohara (JP); Yasuhiro Harada, Isehara (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 328 days.

(21) Appl. No.: 15/260,628

(22) Filed: Sep. 9, 2016

(65) Prior Publication Data

US 2017/0077494 A1  Mar. 16, 2017

(30) Foreign Application Priority Data

Sep. 16, 2015 (JP) ................................. 2015-182804

(51) Int. Cl.
*H01M 4/131* (2010.01)
*H01M 2/34* (2006.01)
(Continued)

(52) U.S. Cl.
CPC ......... *H01M 4/131* (2013.01); *H01M 2/1077* (2013.01); *H01M 2/348* (2013.01);
(Continued)

(58) Field of Classification Search
None
See application file for complete search history.

(56) References Cited

U.S. PATENT DOCUMENTS

2007/0009801 A1  1/2007  Inagaki et al.
2008/0166637 A1  7/2008  Inagaki et al.
(Continued)

FOREIGN PATENT DOCUMENTS

JP  2008-186803 A   8/2008
JP  4213688 B2      11/2008
JP  2015-035420 A   2/2015

OTHER PUBLICATIONS

Extended European Search Report dated Feb. 1, 2017 in Patent Application No. 16187788.1.
(Continued)

*Primary Examiner* — Sarah A. Slifka
*Assistant Examiner* — Haroon S. Sheikh
(74) *Attorney, Agent, or Firm* — Oblon, McClelland, Maier & Neustadt, L.L.P.

(57) ABSTRACT

According to one embodiment, an electrode is provided. The electrode includes an active material containing-layer. The active material containing-layer includes active material particles containing at least one selected from a niobium titanium composite oxide and a composite oxide which is expressed by the general formula $Li_xM1_{1-y}M2_yTi_{6-z}M3_zO_{14+\delta}$. The active material particles include primary particles having an average particle diameter of 0.1 to 10 μm and secondary particles having an average particle diameter of 1 to 30 μm. A pore diameter distribution of the active material containing-layer which is obtained by mercury porosimetry has a first peak which has a maximum value within a range of 0.01 to 2 μm and a second peak which has a maximum value within a range of exceeding 6 μm and equal to or smaller than 20 μm. An intensity of the second peak is $1/10$ to $1/5$ of an intensity of the first peak.

13 Claims, 7 Drawing Sheets

(51) Int. Cl.
  *H01M 4/485*  (2010.01)
  *H01M 4/525*  (2010.01)
  *H01M 2/10*   (2006.01)
  *H01M 10/0525* (2010.01)

(52) U.S. Cl.
  CPC ........... *H01M 4/485* (2013.01); *H01M 4/525* (2013.01); *H01M 10/0525* (2013.01); *H01M 2220/20* (2013.01); *Y02E 60/122* (2013.01)

(56) References Cited

U.S. PATENT DOCUMENTS

| | | |
|---|---|---|
| 2008/0241692 A1 | 10/2008 | Saruwatari et al. |
| 2009/0170002 A1 | 7/2009 | Zhang et al. |
| 2009/0202892 A1 | 8/2009 | Inagaki et al. |
| 2013/0122349 A1 | 5/2013 | Iwasaki et al. |
| 2014/0017520 A1 | 1/2014 | Inagaki et al. |
| 2015/0010820 A1 | 1/2015 | Takami et al. |
| 2015/0104712 A1 | 4/2015 | Kerlau et al. |

OTHER PUBLICATIONS

Damien Dambournet, et al., "$MLi_2Ti_6O_{14}$ (M=Sr, Ba, 2Na) Lithium Insertion Titanate Materials: A Comparative Study" Inorganic Chemistry, vol. 49, No. 6, XP055273926, Mar. 15, 2010, pp. 2822-2826.

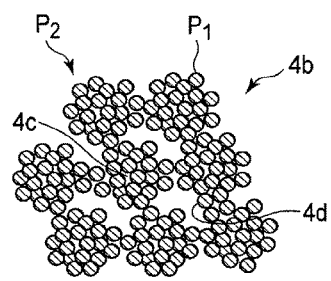
F I G. 1
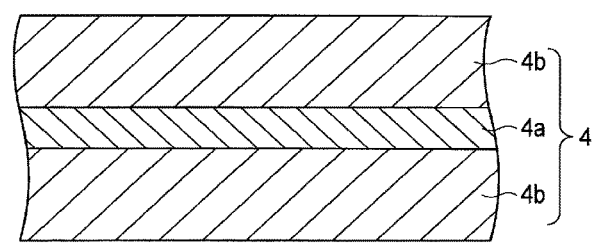
F I G. 2

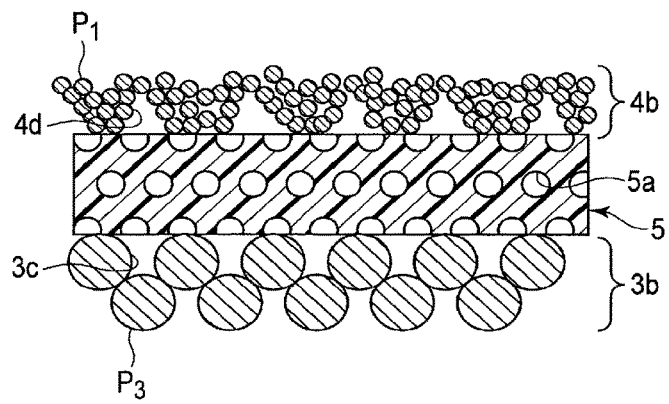
F I G. 5
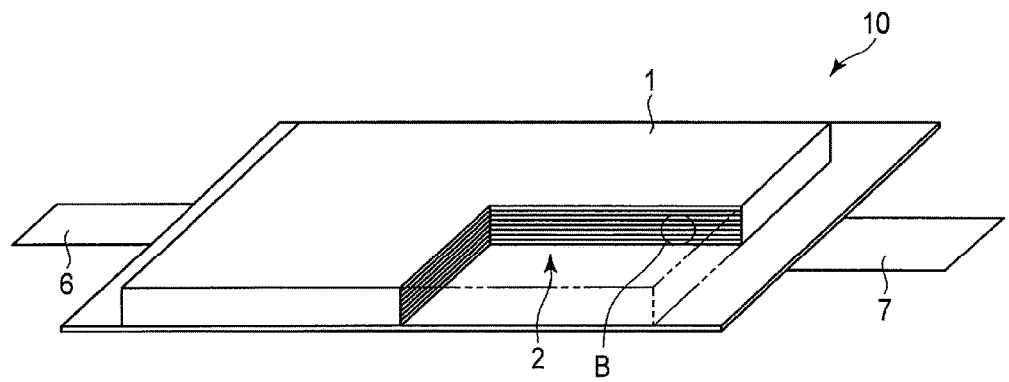
F I G. 6

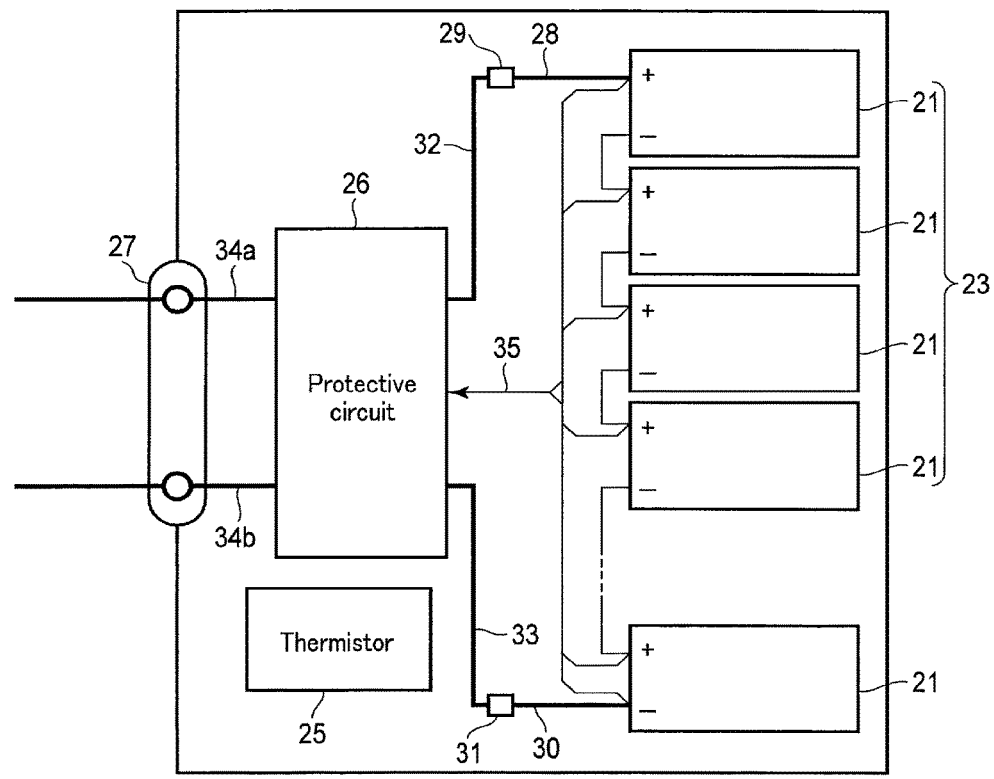
F I G. 10
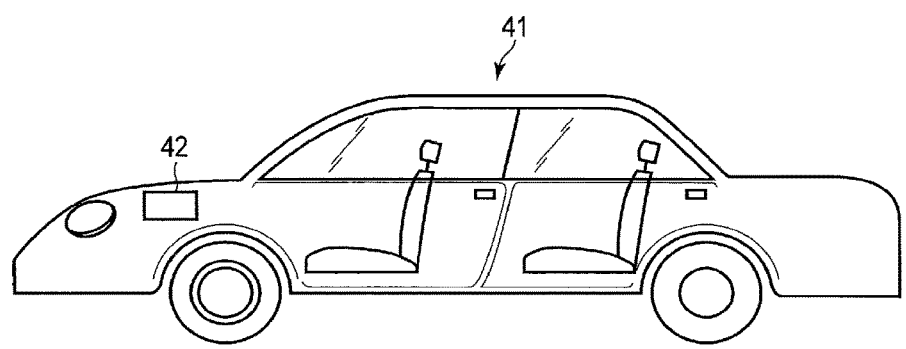
F I G. 11

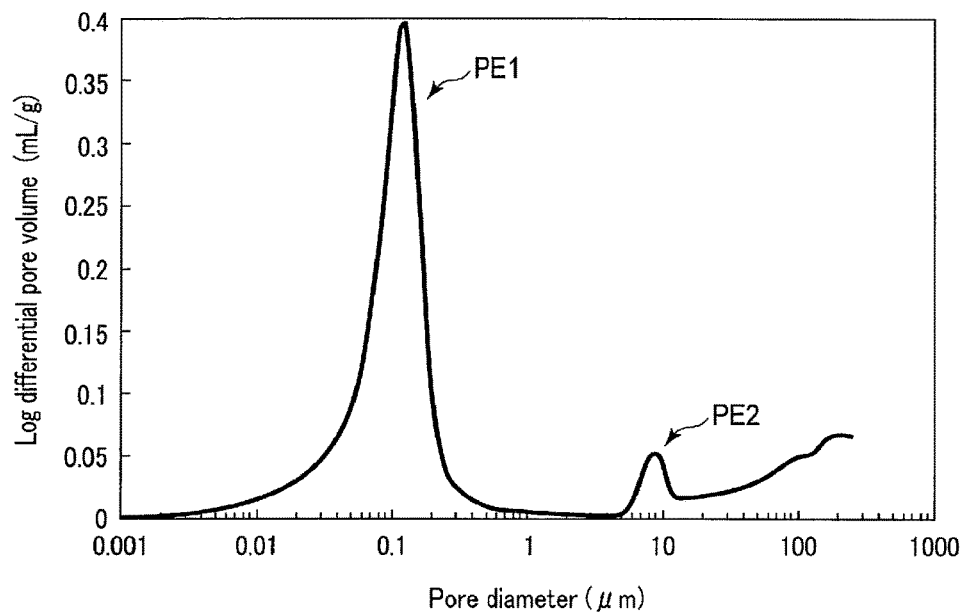
F I G. 12
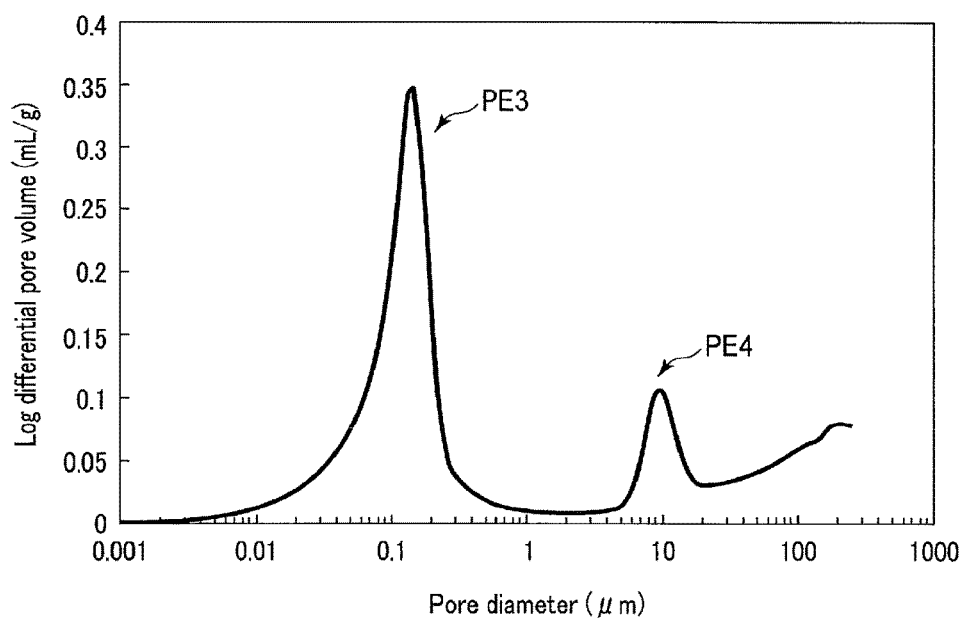
F I G. 13

ELECTRODE, NONAQUEOUS
ELECTROLYTE BATTERY, BATTERY PACK,
AUTOMOBILE, AND VEHICLE

CROSS-REFERENCE TO RELATED
APPLICATIONS

This application is based upon and claims the benefit of priority from Japanese Patent Application No. 2015-182804, filed Sep. 16, 2015, the entire contents of which are incorporated herein by reference.

FIELD

An embodiment of the present invention relates to an electrode for a nonaqueous electrolyte battery, a nonaqueous electrolyte battery, a battery pack, an automobile, and a vehicle.

BACKGROUND

A lithium nonaqueous electrolyte battery has been widely used as a battery with a high energy density in various fields such as electric vehicles, power storage and information devices. In accordance with this, there are increasing requests from the market for nonaqueous electrolyte batteries, and studies have been actively conducted.

Among them, there is a request for a high energy density, that is, a large discharge capacity per unit mass or unit volume of a lithium nonaqueous electrolyte battery, which is used as a power source for an electric vehicle, in terms of its application. Further, there is a request for a battery to be capable of efficiently performing charge even in a case in which a high current is instantly input to the battery in order to recover the kinetic energy produced at the time of deceleration. Further, there is a request for a battery to enable high output, that is, to be capable of instantly discharging a high current, conversely, at the time of start, at the time of rapid start, and at the time of rapid acceleration or the like. That is, there is a demand for a secondary battery as a power source for an electric vehicle to have favorable input and output characteristics in a short period of time as well as a large capacity.

A carbon-based material has been widely used as a negative electrode active material of this lithium nonaqueous electrolyte battery. Recently, however, a focus has been placed on a spinel-type lithium titanate, which has a higher Li inserting-and-extracting potential as compared to the carbon-based material. There is no change in volume accompanying charge and discharge reactions in this spinel-type lithium titanate, which is excellent in cycle characteristics. In addition, this spinel-type lithium titanate has a higher stability as compared to the carbon-based material since there is a low possibility of generation of lithium dendrites, and further, has a great advantage that thermal runaway is hardly caused since the lithium titanate is ceramic.

On the other hand, a nonaqueous electrolyte battery which uses a spinel-type lithium titanate as the negative electrode active material has a problem that an energy density is low, and accordingly, there is a request for a negative electrode material with which a high capacity can be obtained. Thus, studies have been conducted regarding a niobium titanium composite oxide such as $Nb_2TiO_7$ which has a larger theoretical capacity per mass than the spinel-type lithium titanate, $Li_4Ti_5O_{12}$.

BRIEF DESCRIPTION OF THE DRAWINGS

FIG. 1 is an enlarged cross-sectional view illustrating an example of an active material containing-layer according to a first embodiment in an enlarged manner;

FIG. 2 is a schematic cross-sectional view illustrating an example of an electrode according to the first embodiment;

FIG. 5 is a schematic view illustrating the vicinity of boundaries among a positive electrode, a separator, and a negative electrode in the nonaqueous electrolyte battery of FIG. 3;

FIG. 6 is a partially cut perspective view illustrating another example of the nonaqueous electrolyte battery according to the second embodiment;

FIG. 10 is a block diagram illustrating an electric circuit of the battery pack of FIG. 9;

FIG. 11 is a schematic cross-sectional view illustrating an example of a vehicle according to a fourth embodiment;

FIG. 12 is a pore diameter distribution curve of a negative electrode active material containing-layer of a negative electrode of Example 5; and FIG. 13 is a pore diameter distribution curve of a negative electrode active material containing-layer of a negative electrode of Comparative Example 5.

DETAILED DESCRIPTION

Figure 3:
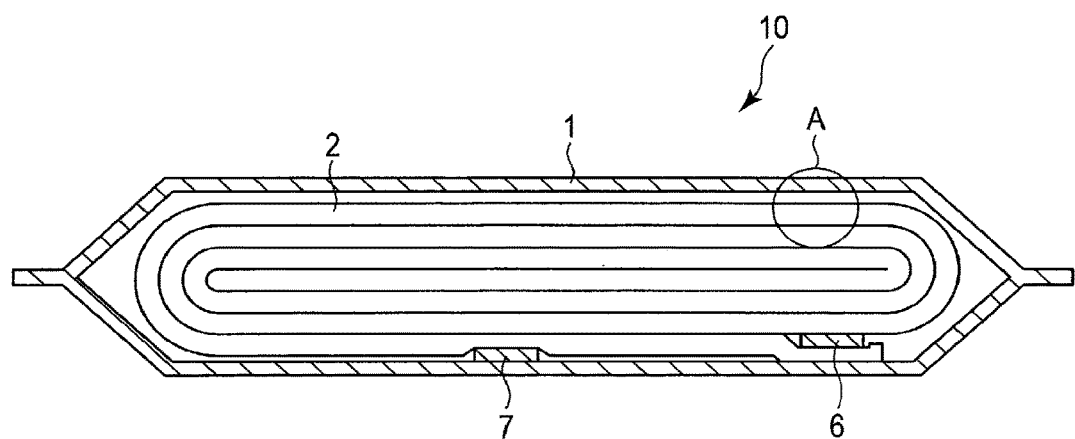
FIG. 3 is a schematic cross-sectional view illustrating an example of a nonaqueous electrolyte battery according to a second embodiment.

An electrode is provided according to an embodiment. This electrode includes a current collector and an active material containing-layer formed on the current collector. The active material containing-layer includes active material particles containing at least one selected from a niobium titanium composite oxide and a composite oxide which is expressed by the general formula $Li_xM1_{1-y}M2_yTi_{6-z}M3_zO_{14+\delta}$. The active material particles includes a primary particles having an average particle diameter within a range of 0.1 μm to 10 μm and a secondary particles having an average particle diameter within a range of 1 μm to 30 μm. A pore diameter distribution of an active material containing-layer which is obtained by mercury porosimetry has a first peak which has a maximum value within a range of 0.01 μm to 2 μm and a second peak which has a maximum value within a range of exceeding 6 μm and equal to or smaller than 20 μm. An intensity of the second peak is 1/10 to 1/5 of an intensity of the first peak. In the above-described formula, M1 is at least one kind which is selected from a group consisting of Sr, Ba, Ca, and Mg, M2 is at least one kind which is selected from a group consisting of Cs, K and Na, M3 is at least one kind which is selected from a group consisting of Al, Fe, Zr, Sn, V, Nb, Ta and Mo, x is within a range of 2≤x≤6, y is within a range of 0<y<1, z is within a range of 0<z≤6, and δ is within a range of −0.5≤δ≤0.5.

A nonaqueous electrolyte battery is provided according to another embodiment. This nonaqueous electrolyte battery includes a negative electrode that includes the electrode according to the embodiment, a positive electrode, and a nonaqueous electrolyte.

A battery pack is provided according to another embodiment. This battery pack includes the nonaqueous electrolyte battery according to the embodiment.

An automobile is provided according to another embodiment. This automobile includes the battery pack according to the embodiment.

A vehicle is provided according to another embodiment. This vehicle includes the battery pack according to the embodiment.

Embodiments are explained below referring to drawings. In the following descriptions, the same reference number is applied to structural features having the same or similar function throughout all drawings, and overlapped explanations are omitted. Each drawing is a schematic view for explaining the embodiment and promoting the understanding thereof. Shapes, sizes and ratios in the drawing, accordingly, may be different from those in a practical apparatus, but they may be appropriately designed and changed considering the following descriptions and known technology.

First Embodiment

The electrode is provided according to the first embodiment. This electrode includes a current collector and an active material containing-layer formed on the current collector. The active material containing-layer includes active material particles containing at least one selected from a niobium titanium composite oxide and a composite oxide which is expressed by the general formula $Li_xM1_{1-y}M2_yTi_{6-z}M3_zO_{14+\delta}$. The active material particles include a primary particles having an average particle diameter within a range of 0.1 to 10 μm and a secondary particles having an average particle diameter within a range of 1 to 30 μm. A pore diameter distribution of an active material containing-layer which is obtained by mercury porosimetry has a first peak which has a maximum value within a range of 0.01 to 2 μm and a second peak which has a maximum value within a range of exceeding 6 μm and equal to or smaller than 20 μm. An intensity of the second peak is ⅒ to ⅕ of an intensity of the first peak. In the above-described formula, M1 is at least one kind which is selected from a group consisting of Sr, Ba, Ca, and Mg, M2 is at least one kind which is selected from a group consisting of Cs, K and Na, M3 is at least one kind which is selected from a group consisting of Al, Fe, Zr, Sn, V, Nb, Ta and Mo, x is within a range of 2≤x≤6, y is within a range of 0<y<1, z is within a range of 0<z≤6, and δ is within a range of −0.5≤δ≤0.5.

Each volume of the niobium titanium composite oxide and the composite oxide expressed by the general formula of $Li_xM1_{1-y}M2_yTi_{6-z}M3_zO_{14+\delta}$ can be changed according to, for example, lithium insertion and extraction during charge and discharge. The pore diameter distribution of the active material containing-layer, which is obtained by mercury porosimetry, has a first peak which has the maximum value within the range of 0.01 to 2 μm. In addition, the pore diameter distribution of the active material containing-layer, which is obtained by mercury porosimetry, has the second peak which has the maximum value within the range of exceeding 6 μm and equal to or smaller than 20 μm. Therefore, it is possible to provide a spatial margin which allows for a change in volume of the composite oxide. Thus, it is possible to suppress breakage of the active material containing-layer caused by the charge and discharge.

Further, when the active material containing-layer contains the active material particles, which contain the primary particles having the average particle diameter within the range of 0.1 to 10 μm, and have a first peak which has the maximum value within the range of 0.01 to 2 μm, the dispersibility of the primary particles of the active material particles is high. Therefore, this active material containing-layer has sufficient space for impregnation with the nonaqueous electrolyte. That is, the active material containing-layer indicating the pore diameter distribution is excellent in impregnation property of the nonaqueous electrolyte.

In addition, the active material containing-layer contains the active material particles, which contain the secondary particles having the average particle diameter within the range of 1 to 30 μm, and have the second peak which has the maximum value within the range of exceeding 6 μm and equal to or smaller than 20 μm. The presence of this second peak indicates that the active material containing-layer has a plurality of pores which are formed of the secondary particles. Each pore diameter of the plurality of pores, formed of the secondary particles, is large as compared to that of a plurality of pores formed of the primary particles. Hereinafter, the plurality of pores formed of the primary particles are referred to as a plurality of first pores, and the plurality of pores formed of the secondary particles are referred to as a plurality of second pores in this specification.

When the pore diameter distribution of the active material containing-layer obtained by the mercury porosimetry has the above-described second peak, and the intensity of the second peak is ⅒ to ⅕ of the intensity of the first peak, the active material containing-layer is excellent in impregnation property of the nonaqueous electrolyte, and further, it is possible to suppress occlusion of the pore caused by repeating charge and discharge. Although the reason therefor is not clear, the inventors have considered it to be as follows.

In general, the ease of a pore being impregnated with the nonaqueous electrolyte increases as a diameter of the pore increases. Accordingly, the plurality of second pores are easily impregnated with the nonaqueous electrolyte as compared to the plurality of first pores.

The plurality of first pores are impregnated with at least a part of the nonaqueous electrolyte with which the plurality of second pores are impregnated. That is, the plurality of second pores mediate the impregnation of the nonaqueous electrolyte to the plurality of first pores present in the vicinity thereof. The above-described point will be described with reference to FIG. 1. FIG. 1 is an enlarged cross-sectional view illustrating an example of the active material containing-layer in an enlarged manner. In FIG. 1, 4b represents the active material content, P1 represents a single primary particle, P2 represents the secondary particle, 4c represents the first pore, and 4d represents the second pore.

The first pore 4c is formed of a plurality of primary particles P1. The second pore 4d is formed of a plurality of secondary particles P2. In the case when the active material containing-layer 4b is impregnated with the nonaqueous electrolyte, for example, the first pore 4c is impregnated with the nonaqueous electrolyte from various directions.

Further, the first pore 4c is easily impregnated with the nonaqueous electrolyte in a case in which the plurality of second pores 4d are present in the vicinity of the first pore 4c, as illustrated in FIG. 1 as compared to a case in which the plurality of second pores 4d are not present. It is considered that a reason thereof is because the nonaqueous electrolyte with which the plurality of second pores 4d are also impregnated is supplied to the first pores 4c. A battery in which the electrode including the active material containing-layer is provided as a negative electrode, for example, in this manner is excellent in impregnation property of the nonaqueous electrolyte and thus, has excellent input and output characteristics with a high current.

In this case, the nonaqueous electrolyte is supplied from the plurality of second pores 4d to the first pore 4c even if a byproduct is generated in the vicinity of the first pore 4c due to repeated charge and discharge. Thus, depletion of the nonaqueous electrolyte in the negative electrode is suppressed. That is, a battery which is provided with the electrode including this active material containing-layer has an excellent cycle life characteristic.

From such reasons, the active material containing-layer is excellent in impregnation property of the nonaqueous electrolyte, and further, it is possible to suppress the occlusion of the pore caused by repeating the charge and discharge when the active material particles contain the primary particles having the average particle diameter within the range of 0.1 to 10 μm and the secondary particles having the average particle diameter within the range of 1 to 30 μm, and the pore diameter distribution of the active material containing-layer obtained by the mercury porosimetry has the first peak, which has the maximum value within the range of 0.01 to 2 μm, and the second peak, which has the maximum value within the range of exceeding 6 μm and equal to or smaller than 20 μm, and further, the intensity of the second peak is 1/10 to 1/5 of the intensity of the first peak.

Therefore, the negative electrode as an electrode according to the first embodiment can realize a nonaqueous electrolyte battery which is excellent in input and output characteristics under a high current, and cycle life characteristic.

The plurality of second pores are impregnated with a large amount of nonaqueous electrolyte in a case in which the number of the plurality of second pores is excessively large; for example, when the intensity of the second peak is more than 1/10 of the intensity of the first peak. At this time, there is a possibility that it is difficult to cause the plurality of first pores to be impregnated with a sufficient amount of nonaqueous electrolyte.

In addition, there is a possibility that the amount of nonaqueous electrolytes supplied from the plurality of second pores to the plurality of first pores is insufficient in a case in which the number of the plurality of second pores is excessively small; for example, when the intensity of the second peak is less than 1/5 of the intensity of the first peak.

Next, the negative electrode according to the first embodiment will be described in more detail.

The pore diameter distribution of the active material containing-layer obtained by mercury porosimetry has a first peak which has the maximum value within the range of 0.01 to 2 μm and a second peak which has the maximum value within the range exceeding 6 μm and equal to or smaller than 20 μm. The first peak is a peak which has a maximum value within, more preferably, a range of 0.09 to 0.4 μm. The second peak is a peak which has a maximum value within, more preferably, a range of 6.1 to 15 μm. In addition, the intensity of the second peak is 1/10 to 1/5 of the intensity of the first peak, and preferably, this intensity ratio is 1/8 to 1/5.

It is preferable that a current collector be an aluminum foil or an aluminum alloy foil. It is preferable that the current collector has an average crystal particle diameter equal to or smaller than 50 μm. It is possible to drastically increase the strength of the current collector when the average crystal particle diameter is equal to or smaller than 50 μm, and thus, it is possible to obtain a high density electrode with high pressing pressure, and to increase a battery capacity. In addition, it is possible to prevent deterioration due to melting and corrosion of the current collector in an over-discharge cycle under a high temperature environment (equal to or higher than 40° C.) when the average crystal particle diameter is equal to or smaller than 50 μm, and thus, it is possible to suppress an increase of the impedance. Further, it is possible to improve output characteristics, rapid charge, and charge-and-discharge cycle characteristics. A more preferable range of the average crystal particle diameter is equal to or smaller than 30 μm, and a still more preferable range thereof is equal to or smaller than 5 μm.

The average crystal particle diameter is obtained as follows. A constitution of a surface of the current collector is observed with an optical microscope (100×), thereby obtaining the number n of crystal particles existing within 1×1 mm. An average crystal particle area S is obtained from $S=1\times10^6/n$ (μm$^2$) using this n. An average crystal particle diameter d (μm) is calculated from the following Formula (1) from the obtained value of S.

$$d=2(S/\pi)^{1/2} \qquad (1)$$

The average crystal particle diameter of the aluminum foil or the aluminum alloy foil is affected by many factors such as material composition, impurities, processing conditions, heat treatment history, and heating conditions in annealing, and thus, is adjusted during a manufacturing process by considering the above-described factors.

A thickness of the aluminum foil or the aluminum alloy foil is equal to or smaller than 20 μm, and more preferably, is equal to or smaller than 15 μm. It is preferable that a purity of the aluminum foil be equal to or higher than 99%. It is preferable to use an alloy containing an element such as magnesium, zinc, and silicon as the aluminum alloy. On the other hand, it is preferable that a content of a transition metal such as iron, copper, nickel, and chromium be equal to or lower than 1%.

The active material containing-layer may be formed on a single surface of the current collector or formed on both surfaces. In addition, the current collector can have a portion whose surface does not carry the active material containing-layer, and this portion can function as an electrode tab.

The active material containing-layer contains the active material particles including at least one selected from a niobium titanium composite oxide and composite oxide which is expressed by the general formula $Li_xM1_{1-y}M2_yTi_{6-z}M3_zO_{14+\delta}$. In the above-described formula, M1 is at least one kind which is selected from a group consisting of Sr, Ba, Ca, and Mg, M2 is at least one kind which is selected from a group consisting of Cs, K and Na, M3 is at least one kind which is selected from a group consisting of Al, Fe, Zr, Sn, V, Nb, Ta and Mo, x is within a range of $2\le x\le 6$, y is within a range of $0<y<1$, z is within a range of $0<z\le 6$, and δ is within a range of $-0.5\le\delta\le 0.5$. One kind of the element may be used alone or two kind or more may be used in combination.

Examples of the niobium titanium composite oxide include $Nb_2TiO_7$, $Nb_2Ti_2O_{19}$, $Nb_{10}Ti_2O_9$, $Nb_{24}TiO_{62}$, $Nb_{14}TiO_{37}$, $Nb_2Ti_2O_9$ and the like. The niobium titanium composite oxide may be a substituted niobium titanium composite oxide wherein at least a part of Nb or Ti is substituted with a dopant. Examples of the substituted element can include V, Cr, Mo, Ta, Zr, Mn, Fe, Mg, B, Pb, and Al. One kind of the element may be used alone or two kind or more may be used in combination. The active material particles may contain one kind of the niobium titanium composite oxide, or a plurality of kinds of the niobium titanium composite oxide. It is preferable if the niobium titanium composite oxide contains a titanium composite oxide, $Nb_2TiO_7$ having a monoclinic structure in a case in which the active material particles contain the niobium titanium composite oxide.

The active material particles contain a single primary particle and secondary particle in which the primary particles are aggregated. The average particle diameter of the primary particles is within the range of, for example, 0.1 to 10 μm, and preferably within a range of 0.5 to 5 μm. The average particle diameter of the secondary particles is within the range of, for example, 1 to 30 μm, and preferably, within a range of 3 to 15 μm. The distribution of the nonaqueous electrolyte is biased to the negative electrode side when the average particle diameter of the primary particles is excessively small, and there is a risk of depleting the nonaqueous electrolyte in the positive electrode. The volume of a gap between the active material particles increases when the average particle diameter of the primary particles is excessively large, there is a possibility that electrical resistance increases.

It is preferable that the active material particles include carbon-containing layers with which at least a part of a surface of the primary particles or the secondary particles is coated. The carbon-containing layer can be formed using, for example, a carbon material, a graphite material or the like. When the active material particles include the carbon-containing layer, electron conductivity is improved, and input and output characteristics under a high current are further improved. In addition, an electrode containing the active material particles including the carbon-containing layers can suppress generation of overvoltage, and thus, it is possible to realize a nonaqueous electrolyte battery having a more excellent cycle life characteristic.

The active material particles may contain another active material particles which is different from niobium titanium composite oxide, and also different from the composite oxide expressed by the general formula $Li_xM1_{1-y}M2_yTi_{6-z}M3_zO_{14+\delta}$. Examples of other active material particles include spinel-type lithium titanate $Li_4Ti_5O_{12}$, an anatase-type titanium dioxide particle, and a monoclinic β-titanium dioxide, $TiO_2$ (B).

A content of the other active material particles is less than, for example, 50 mass % with respect to a total mass of the active material particles in a case in which the active material particles contain another active material particles which is different from the niobium titanium composite oxide and also different from the composite oxide expressed by the general formula $Li_xM1_{1-y}M2_yTi_{6-z}M3_zO_{14+\delta}$.

A specific surface area according to the BET method using adsorption of $N_2$ of the active material is within a range of, for example, 1 to 30 $m^2/g$, and preferably, within a range of 5 to 15 $m^2/g$. An active material particles having a specific surface area within the range of 1 to 30 $m^2/g$ can have sufficient area to contribute to the electrode reaction, and can realize an excellent high current discharge characteristic. In addition, the active material particles having a specific surface area within the range of 1 to 30 $m^2/g$ can adequately perform a reaction between the electrode and the nonaqueous electrolyte, and suppress a deterioration in the charge-and-discharge efficiency or generation of gas during storage. Further, an active material containing-layer that contains the active material particles having a specific surface area within the range of 1 to 30 $m^2/g$ can suppress biasing of the distribution of the nonaqueous electrolyte toward the electrode.

The effective area contributing to the electrode reaction is small when the specific surface area is less than 1 $m^2/g$, and there is a risk that the high current discharge characteristic deteriorates. On the other hand, the level of reaction between the electrode and the nonaqueous electrolyte increases when the specific surface area exceeds 30 $m^2/g$, and thus, there is a risk of inducing deterioration in the charge-and-discharge efficiency or generation of a gas during storage.

The active material containing-layer can further contain a conductive agent. The conductive agent can enhance electron conductivity and current-collecting performance of the active material containing-layer, and further, can reduce a contact resistance between the active material containing-layer and the current collector. A carbon-based material, for example, acetylene black, coke, carbon black, graphite or the like can be used as the conductive agent. It is preferable that the average particle diameter of the conductive agent be equal to or larger than 0.05 μm in order to effectively suppress the generation of gas, and be equal to or smaller than 20 μm in order to construct a favorable conduction network. It is preferable that the specific surface area of the conductive agent b be equal to or larger than 5 $m^2/g$ in order to construct a favorable conduction network, and be equal to or smaller than 100 $m^2/g$ in order to effectively suppress generation of a gas.

The active material containing-layer can further contain a binder. The binder can fill the gap between the active material particles and bind the active material particles and the conductive agent. Polyvinylidene fluoride (PVdF), or acrylic rubber, acrylic resin, styrene-butadiene-based rubber, a cellulose-based binder, for example, which has an average molecular weight of from $2 \times 10^5$ to $20 \times 10^5$, can be used as the binder. A more preferable average molecular weight is from $5 \times 10^5$ to $10 \times 10^5$. Examples of the cellulose-based binder include carboxymethyl cellulose and hydroxypropyl methylcellulose.

It is possible to set a peel strength between the current collector and the active material containing-layer to be equal to or more than 0.005 N/mm using a PVdF with a molecular weight within the above-described range, which causes improvement in high current characteristic. Although it is possible to obtain a sufficient peel strength when the average molecular weight exceeds $20 \times 10^5$, the viscosity of a coating solution increases too much, and accordingly, it is difficult or impossible to adequately perform the coating.

Meanwhile, a zeta potential of the active material particles changes depend on a pH of the slurry in which the active material particles are dispersed. It is preferable that the pH of the slurry be away from an isoelectric point at which the zeta potential of the active material particles included in the slurry becomes 0 V. In this manner, individual active material particles have repulsive zeta potentials, and thus, the active material particles are hardly aggregated. On the other hand, the active material particles are easily aggregated when the pH of the slurry is near the isoelectric point.

The isoelectric point of the zeta potential in water, for example, is present near a pH of 2.0 to 4.5 in the case of a monoclinic niobium titanium composite oxide, and near a pH of 10 to 12 in the case of a composite oxide expressed by the general formula $Li_xM1_{1-y}M2_yTi_{6-z}M3_zO_{14+\delta}$.

For example, the pH of the slurry is preferably within a range of 7.0 to 9.0, and more preferably, within a range of 7.0 to 8.0. When the pH is excessively low, dispersibility of the active material deteriorates, and further, a SUS part of the coating device is corroded, which is not preferable. When the pH is excessively high, there is a possibility that the aluminum foil of the current collector is corroded.

The pH of the slurry changes depending on the composition of active material particles included in the active material containing-layer. Alternatively, the pH of the slurry of the electrode changes depending on a kind or amount of the conductive agent, the binder or the like.

For example, the niobium titanium composite oxide acts as an acid in water. Therefore, slurry mainly containing the niobium titanium composite oxide tends to have a pH of weakly acidic to neutral level. On the other hand, the composite oxide expressed by the general formula $Li_xM1_{1-y}M2_yTi_{6-z}M3_zO_{14+\delta}$ typically acts as a base in water. Therefore, a slurry mainly containing the composite oxide expressed by the general formula of $Li_xM1_{1-y}M2_yTi_{6-z}M3_zO_{14+\delta}$ tends to have a weakly basic pH.

In addition, for example, some of the conductive agents and the binders are acidic and others are basic in water.

Accordingly, the pH of the slurry is close to the isoelectric point of the active material particles depending on the composition of the slurry. In this case, it is preferable to set the pH of the slurry to a direction away from the pH of the isoelectric point described above by using a pH adjusting agent or suitably changing each kind and amount of the conductive agent and the binder.

Sodium carbonate, sodium hydroxide, calcium oxide, calcium hydroxide, calcium carbonate, and magnesium hydroxide can be exemplified as the pH adjusting agent which is basic in water. Among them, sodium carbonate rapidly reacts, and is easily available, which is preferable. Sulfuric acid, hydrochloric acid, nitric acid, phosphoric acid, acetic acid, and the like can be exemplified as the pH adjusting agent which is acidic in water.

Incidentally, a binder such as carboxymethyl cellulose, styrene-butadiene rubber is most stable near a pH of 7.0. When the pH of the slurry is too low or high, the viscosity of carboxymethyl cellulose decreases or styrene-butadiene rubber is corroded, and the binding property deteriorates, which is not preferable.

It is preferable that the blending ratio of the active material particles, the conductive agent, the binder, and the pH adjusting agent in the active material containing-layer be within a range of the active material particles of 65 to 98 mass %, the conductive agent of 1 to 25 mass %, the binder of 1 to 10 mass %, the pH adjusting agent of 0.1 to 2 mass %, respectively. It is possible to obtain a high current-collecting performance by setting the amount of the conductive agent to be equal to or higher than 2 mass %, and thus, it is possible to obtain an excellent high current characteristic. On the other hand, it is preferable that the amount of the conductive agent be equal to or lower than 20 mass % from a viewpoint of increasing capacity. In addition, it is possible to set the peel strength to be equal to or more than 0.005 N/mm by setting the amount of the binder to be equal to or higher than 1 mass %. It is possible to obtain a suitable viscosity of the coating solution and to perform favorable coating by setting the amount of the binder to be equal to or lower than 6 mass %.

As described above, the pore diameter distribution of the active material containing-layer obtained by mercury porosimetry has a first peak which has maximum value within the range of 0.01 to 2 µm and a second peak which has maximum value within the range of exceeding 6 µm and equal to or smaller than 20 µm. The first peak is a peak which has a maximum value within, more preferably, a range of 0.09 to 0.4 µm. The second peak is a peak which has a maximum value within, more preferably, a range of 6.1 to 15 µm. In addition, the intensity of the second peak is 1/10 to 1/5 of the intensity of the first peak, and preferably, this intensity ratio is 1/8 to 1/5.

It is possible to achieve the above-described pore diameter distribution by adjusting, for example, the pH of the slurry of the negative electrode, the particle diameter of acetylene black, the viscosity of carboxymethyl cellulose, the particle diameter of styrene-butadiene rubber, and the like. The peak intensity of the pore diameter distribution tends to increase when the viscosity of carboxymethyl cellulose aqueous solution increases, for example.

It is preferable that the density of the active material containing-layer be equal to or higher than 2.4 g/cm$^3$ and lower than 2.9 g/cm$^3$. A negative electrode which has a density of the active material containing-layer of equal to or higher than 2.4 g/cm$^3$ can have sufficient contact with an electron conduction path, and can realize excellent input and output characteristics under a high current. In addition, it is more preferable that the density of the active material containing-layer be lower than 2.8 g/cm$^3$.

The pore diameter distribution of the electrode depends on, for example, the particle diameter distribution and blending amount of a substance having a particle shape included in the active material containing-layer, a method of preparing the slurry for manufacture of the electrode, a pressing pressure of a coating film, and the like.

The electrode can be manufactured by, for example, suspending the active material particles, the binder, the conductive agent, and the pH adjusting agent with a suitable solvent to prepare a slurry, coating the surface of the current collector with the slurry, drying the slurry to form the active material containing-layer, and then, performing pressing. It is possible to adjust the pH of the slurry of the negative electrode using the above-described method. The electrode may be manufactured by forming active material particles, binder, and conductive agent in a pellet shape to form the active material containing-layer, and arranging the active material containing-layer on the current collector.

Next, a description will be given regarding a method of measuring the pore diameter distribution of the active material containing-layer obtained by mercury porosimetry, a method of measuring the particle diameter of the active material particles included in the active material containing-layer, and a method of measuring the pH of slurry.

When the measurement is performed regarding the electrode incorporated in the battery, the electrode is taken out from the battery in the following order.

First, the battery is discharged to have a remaining capacity of 0%. The discharged battery is put into a glove box in an inert atmosphere. During this process, external packaging of the cell is cut and opened while paying attention not to cause any short circuit of the positive electrode and the negative electrode, just in case. During this process, the electrode connected to a terminal on the negative electrode side is cut out in the case of the electrode being used in the negative electrode. The cut-out electrode is washed inside a container filled with methyl ethyl carbonate (MEC) while lightly performing shaking. Thereafter, the electrode is taken out, the taken-out electrode is put into a vacuum dryer, and methyl ethyl carbonate is blown out in the dryer. Next, the electrode is taken out from the glove box. A part of the taken-out electrode is immersed into pure water and is lightly shaken such that powder is allowed to settle. If an aqueous binder is used, the powder is more peeled off from the electrode through this operation. If there is almost no change, the electrode is immersed into N-methylpyrrolidone (NMP), and is lightly shaken in the same manner such that powder is allowed to settle.

<Method of Measuring Pore Diameter Distribution According to Mercury Porosimetry>

Measurement of the pore diameter distribution of the active material containing-layer according to mercury porosimetry is performed in the following procedure, for example.

First, the electrode serving as an object to be measured is divided into the active material containing-layer and the current collector. A sample having a size of about 50×50 mm is cut out from the active material containing-layer separated from the current collector. This sample is folded and taken as a measurement cell, and is subjected to measurement under conditions of an initial pressure of 5 kPa (about 0.7 psia which corresponds to a pore diameter of about 250 μm) and a terminal pressure of about 60 thousand psia (which corresponds to a pore diameter of about 0.003 μm).

For example, Autopore 9520, manufactured by Shimadzu Corporation can be used as the measurement device of the pore diameter distribution. It is possible to obtain a volume of pores and a mode diameter and a median diameter of a gap from the pore diameter distribution according to mercury porosimetry.

Incidentally, the principle utilized in analysis by mercury porosimetry is the Washburn equation of Formula (1).

$$D = -4\gamma\cos\theta/P \quad \text{Formula (1)}$$

Herein, P indicates a pressure, D indicates a pore diameter, $\gamma$ indicates a surface tension (480 dyne·cm$^{-1}$) of mercury, and $\theta$ indicates a contact angle between mercury and a pore wall surface, that is, 140°. Since $\gamma$ and $\theta$ are constants, the relation between the pressure P and the pore diameter D is obtained from Washburn's equation, and it is possible to derive the pore diameter and volume distribution by measuring the volume of intruded mercury at that time.

<Method of Measuring Particle Diameter of Active Material Particles>

The particle diameter of the active material particles can be measured using a particle size distribution measuring instrument. Meanwhile, it is also possible to perform scanning electron microscopy (SEM) of a surface or a cross section of the electrode using a part of an electrode group which has been taken out. When the secondary particles are present, the particles are gathered to form a shape close to a sphere. When such a shape is not present, it is considered that particles thereof are only primary particles. A diameter of the particle is determined using a scale of an SEM image or using an SEM measuring function.

<Method of Measuring pH of Slurry>

Measurement of the pH of the slurry is performed as follows, for example. For example, F-74, manufactured by Horiba, Ltd. is used. First, standard solutions having pHs of 4.0, 7.0 and 9.0 are prepared. Next, calibration of F-74 is performed using these standard solutions. A slurry of 100 mL, which is the object to be measured, is put into a container, and the pH thereof is measured. A sensor unit of F-74 is washed after the measurement of pH. The above-described procedure, that is, calibration, measurement, and washing are performed whenever a slurry as the object to be measured is measured.

Next, an example of the electrode according to the first embodiment will be described with reference to FIG. 2. FIG. 2 is a schematic cross-sectional view illustrating the example of the electrode according to the first embodiment.

An electrode 4 illustrated in FIG. 2 is provided with a current collector 4a and active material containing-layers 4b which are formed on both surfaces of the current collector 4a.

The current collector 4a can be made of a strip-shaped metal or alloy foil although both ends thereof are not illustrated in FIG. 2.

The active material containing-layer 4b is carried on the current collector 4a. The active material containing-layer 4b contains the above-described active material particles.

The current collector 4a include parts (not illustrated) that do not carry the active material containing-layer 4b on both the surfaces thereof. These parts can function as the electrode tab.

The electrode according to the first embodiment contains the active material particles including at least one selected from a niobium titanium composite oxide and a composite oxide which is expressed by a general formula of $Li_xM1_{1-y}M2_yTi_{6-z}M3_zO_{14+\delta}$. The active material particles contain primary particles having an average particle diameter within a range of 0.1 to 10 μm and secondary particles having an average particle diameter within a range of 1 to 30 μm. A pore diameter distribution of an electrode active material containing-layer which is obtained by mercury porosimetry has a first peak which has a maximum value within a range of 0.01 to 2 μm and a second peak which has a maximum value within a range of exceeding 6 μm and equal to or smaller than 20 μm. The intensity of the second peak is 1/10 to 1/5 of the intensity of the first peak. This active material containing-layer can obtain both an excellent impregnation property of the nonaqueous electrolyte and an excellent electrical conduction between the active material particles, and further, to prevent occlusion of pores and breakage of the active material containing-layer caused by repeated charge and discharge. As a result, the electrode according to the first embodiment can realize a nonaqueous electrolyte battery which is excellent in input and output characteristics under a high current, and cycle life characteristic.

Second Embodiment

A nonaqueous electrolyte battery is provided according to the second embodiment. This nonaqueous electrolyte battery includes a negative electrode that includes the electrode according to the first embodiment, a positive electrode, and a nonaqueous electrolyte. Since the electrode has been described in the first embodiment, the negative electrode serving as the electrode herein will not be described.

The positive electrode is provided with a positive electrode current collector and a positive electrode active material containing-layer formed on the positive electrode current collector.

The positive electrode active material containing-layer may be carried on any one surface of the positive electrode current collector, or carried on both surfaces of the positive electrode current collector. The positive electrode current collector can have a portion whose surface does not carry the active material containing-layer, and this portion can function as a positive electrode tab.

The positive electrode active material containing-layer can contain positive electrode active material particles and a conductive agent and a binder in an arbitrary manner.

The positive electrode can be manufactured by, for example, suspending the positive electrode active material particles, the binder, and the conductive agent in a suitable solvent to prepare a slurry, coating the surface of the positive electrode current collector with the slurry, drying the slurry to form the positive electrode active material containing-layer, and then, performing pressing. The pH of the slurry of the positive electrode may be adjusted similarly to the pH of the slurry of the negative electrode described above. The positive electrode may be manufactured by forming the positive electrode active material, the binder, and the conductive agent in a pellet shape to form the active material containing-layer, and arranging the positive electrode active material containing-layer on the positive electrode current collector.

The positive electrode and the negative electrode are arranged such that, for example, the positive electrode active material containing-layer opposes the negative electrode active material containing-layer, and form the electrode group. In this case, it is possible to arrange a material which allows lithium ions to pass therethrough and cuts off electricity, for example, a separator between the positive electrode active material containing-layer and the negative electrode active material containing-layer.

The electrode group can have various structures. The electrode group may have a stacked structure or may have a wound structure. The stacked structure is a structure in which, for example, a plurality of negative electrodes and a plurality of positive electrodes are stacked with the separator interposed between the negative electrode and the positive electrode. The electrode group having the wound structure may be, for example, a can-type structural body, which is obtained by winding a member in which the negative electrode and the positive electrode are stacked with the separator interposed therebetween, or a flat-type structural body which is obtained by pressing this can-type structural body.

It is possible to electrically connect the positive electrode tab to a positive electrode terminal. It is possible to electrically connect the negative electrode tab to a negative electrode terminal. It is possible to configure the positive electrode terminal and the negative electrode terminal to extend from the electrode group.

The electrode group can be housed in a container member. The container member may have a structure that enables the positive electrode terminal and the negative electrode terminal to extend to the outside thereof. Alternatively, the container member may be configured to include two external terminals such that each of the external terminals is electrically connected to each of the positive electrode terminal and the negative electrode terminal.

The nonaqueous electrolyte battery according to the second embodiment is further provided with a nonaqueous electrolyte. The electrode group can be impregnated with the nonaqueous electrolyte. In addition, the nonaqueous electrolyte can be housed in the container member.

Hereinafter, a description will be given regarding a material of each member that can be used in the nonaqueous electrolyte battery according to the second embodiment.

(1) Negative Electrode

It is possible to use the material that has been described in the first embodiment as the negative electrode.

(2) Positive Electrode

It is possible to use various types of oxides, sulfides, polymers, and the like as the positive electrode active material particles. For example, manganese dioxide ($MnO_2$), iron oxide, copper oxide, and nickel oxide, which are capable of containing lithium, a lithium manganese composite oxide (for example, $Li_xMn_2O_4$ or $Li_xMnO_2$), a lithium nickel composite oxide (for example, $Li_xNiO_2$), a lithium cobalt composite oxide ($Li_xCoO_2$) a lithium nickel cobalt composite oxide (for example, $LiNi_{1-y}Co_yO_2$), a lithium manganese cobalt composite oxide (for example, $LiMn_yCo_{1-y}O_2$), a lithium manganese nickel composite oxide having a spinel structure ($Li_xMn_{2-y}NiO_4$), a lithium phosphorus oxide having an olivine structure ($Li_xFePO_4$, $Li_xFe_{1-y}Mn_yPO_4$, $Li_x$-$CoPO_4$, or the like), iron sulfate ($Fe_2(SO_4)_3$), vanadium oxide (for example, $V_2O_5$), and the like can be exemplified. In addition, a conductive polymer material such as polyaniline or polypyrrole, a disulfide-based polymer material, and an organic material and an inorganic material such as sulfur (S) or carbon fluoride can be also exemplified. One kind of the positive electrode active material may be used alone or two kind or more may be used in combination.

A material with which a high battery voltage is obtained can be exemplified as a more preferable positive electrode active material for a secondary battery. For example, lithium manganese composite oxide ($Li_xMn_2O_4$), lithium nickel composite oxide ($Li_xNiO_2$), lithium cobalt composite oxide ($Li_xCoO_2$), lithium nickel cobalt composite oxide ($Li_xNi_{1-y}Co_yO_2$), lithium manganese nickel composite oxide having a spinel structure ($Li_xMn_{2-y}Ni_yO_4$), lithium manganese cobalt oxide ($Li_xMn_yCo_{1-y}O_2$), lithium iron phosphate ($Li_xFePO_4$), and the like can be exemplified. Incidentally, it is preferable that x and y be within a range of 0 to 1.

In addition, the lithium nickel cobalt manganese composite oxide whose composition is expressed by $Li_aNi_bCo_cMn_dO_2$ (with molar ratios a, b, c and d within the following range: $0 \leq a \leq 1.1$, $0.1 \leq b \leq 0.5$, $0 \leq c \leq 0.9$, and $0.1 \leq d \leq 0.5$) can be used as the positive electrode active material particles.

It is preferable to use lithium iron phosphate, $Li_xVPO_4F$, lithium manganese composite oxide, lithium nickel composite oxide, or lithium nickel cobalt composite oxide from the viewpoint of cycle life at the time of using the nonaqueous electrolyte that contains an ambient temperature molten salt. This is because the reactivity between the above-described positive electrode active material particles and the ambient temperature molten salt is low.

Examples of the conductive agent can include acetylene black, carbon black, graphite, and the like.

Examples of the binder include polytetrafluoroethylene (PTFE), polyvinylidene fluoride (PVdF), fluorinated rubber, acrylic rubber, acrylic resin, and the like.

It is preferable that the blending ratio of the positive electrode active material particles, the conductive agent, and the binder be within a range of the positive electrode active material particles of 80 to 95 mass %, the conductive agent of 3 to 18 mass %, and the binder of 2 to 17 mass %.

It is preferable that the positive electrode current collector be an aluminum foil or an aluminum alloy foil. It is preferable that the positive electrode current collector have an average crystal particle diameter equal to or smaller than 50 μm. It is possible to drastically increase the strength of the positive electrode current collector when the average crystal particle diameter is equal to or smaller than 50 μm, and thus, it is possible to obtain a highly dense positive electrode using a high pressing pressure, and to increase a battery capacity. A more preferable range of the average crystal particle diameter is equal to or smaller than 30 μm, and a still more preferable range thereof is equal to or smaller than 5 μm.

The average crystal particle diameter of the aluminum foil or the aluminum alloy foil is affected by many factors such as material composition, impurities, processing conditions, heat treatment history, and heating conditions in annealing, and thus, is adjusted during a manufacturing process by accounting for the above-described factors.

A thickness of the aluminum foil or the aluminum alloy foil is equal to or smaller than 20 μm, and more preferably, is equal to or smaller than 15 μm. It is preferable that the purity of the aluminum foil be equal to or higher than 99%. It is preferable to use an alloy containing an element such as magnesium, zinc, and silicon as the aluminum alloy. On the other hand, it is preferable that the content of a transition metal such as iron, copper, nickel, and chromium be equal to or lower than 1%.

It is desirable that the density of the positive electrode active material containing-layer be equal to or higher than 3 g/cm$^3$. In this manner, it is possible to lower a resistance of an interface between the positive electrode and the separator, and thus, it is possible to further improve the input and output characteristic under a high current. In addition, it is possible to promote diffusion of the nonaqueous electrolyte by capillarity, and thus, it is possible to suppress the deterioration in cycle caused by depletion of the nonaqueous electrolyte.

(3) Separator

It is possible to use a porous separator as the separator. Examples of the porous separator can include a porous film containing polyethylene, polypropylene, cellulose, or polyvinylidene fluoride (PVdF), non-woven fabric made of synthetic resin, and the like. Among them, the porous film made of polyethylene or polypropylene, or the both, can improve the stability of the secondary battery, which is preferable.

The percentage of voids of the separator by the mercury porosimetry is desirably 50% or more. The percentage of voids is desirably 50% or more from the viewpoint of improving maintenance of the nonaqueous electrolyte and improving the input/output density. Also, the percentage of voids is desirably 70% or less from the viewpoint of ensuring the safety of battery. A more desirable range of the percentage of voids is 50 to 65%.

The median diameter and mode diameter can be determined from the pore diameter distribution of a separator by the mercury porosimetry. Here, the mode diameter refers to a peak top of a pore diameter distribution curve in which the horizontal axis represents the pore diameter and the vertical axis represents the frequency. The median diameter is a pore diameter whose cumulative volume frequency is 50%.

When a median diameter of a gap of the separator according to mercury porosimetry is set to be larger than the mode diameter, there are many gaps having a large diameter, and thus, it is possible to reduce a resistance of the separator.

As the separator is exposed under a high-temperature environment, or exposed under a high-potential (oxidizing atmosphere) environment, the resistance thereof increases. That is, the resistance of the separator increases due to deposition of reaction products (clogging of the separator) accompanying degeneration of the separator itself and a side reaction caused on the surface of the electrode, thereby degrading the performance of the battery. At this time, when a potential of the negative electrode is low, some decomposition products generated at an interface between the positive electrode and the nonaqueous electrolyte are likely to deposited on the surface of the negative electrode.

The negative electrode, which contains the negative electrode active material whose Li-inserting potential is equal to or higher than 0.4 V (vs. Li/Li$^+$), has a high potential, and thus, decomposition products are hardly precipitated on the negative electrode side. Therefore, it is possible not only to suppress the occlusion of gaps in contact with the negative electrode of the separator, but also, to suppress the occlusion of gaps caused by degeneration of the separator itself. Thus, even if the separator is exposed under a high-temperature environment in a charged state for a long period of time, it is possible to remarkably suppress deterioration of the high current performance.

It is preferable to configure the separator such that the mode diameter of the gap according to mercury porosimetry is from 0.05 μm to 0.4 μm. A more preferable range is from 0.10 μm to 0.35 μm.

It is preferable to configure the separator such that the median diameter of the gap according to mercury porosimetry is from 0.1 μm to 0.5 μm. A more preferable range is from 0.12 μm to 0.40 μm.

(4) Nonaqueous Electrolyte

A liquid nonaqueous electrolyte can be used as the nonaqueous electrolyte.

The liquid nonaqueous electrolyte can be prepared by, for example, dissolving an electrolyte in an organic solvent.

As the electrolyte, for example, lithium salts such as lithium perchlorate (LiClO$_4$), lithium hexafluorophosphate (LiPF$_6$), lithium tetrafluoroborate (LiBF$_4$), lithium hexafluoroarsenic (LiAsF$_6$), lithium trifluoromethanesulfonate (LiCF$_3$SO$_3$), and lithium bis-trifluoromethyl sulfonylimide (LiN(CF$_3$SO$_2$)$_2$) can be cited.

It is preferable that the electrolyte be dissolved within a range of 0.5 to 2.5 mol/L with respect to an organic solvent.

As the organic solvent, for example, cyclic carbonate such as ethylene carbonate (EC), propylene carbonate (PC), and vinylene carbonate (VC), chain carbonate such as dimethyl carbonate (DMC), methylethyl carbonate (MEC), and diethyl carbonate (DEC), cyclic ether such as tetrahydrofuran (THF) and 2-methyltetrahydrofuran (2MeTHF), chain ether such as dimethoxy-ethane (DME), γ-butyrolactone (BL), acetonitrile (AN), and sulfolane (SL) can be cited. These organic solvents can be used singly or in combinations of two or more.

An room-temperature-molten salt containing lithium ions may be used as the liquid nonaqueous electrolyte.

The room-temperature-molten salt means a salt at least part of which can exist in a liquid state at room temperature. The term "room temperature" means a temperature range in which power sources are assumed to usually operate. The temperature range is, for example, from an upper limit of about 120° C. or about 60° C., depending on the case, to a lower limit of about −40° C. or about −20° C., depending on the case.

A lithium salt with a wide potential window, which has been generally used in nonaqueous electrolyte batteries, is used as the lithium salt. For example, LiBF$_4$, LiPF$_6$, LiClO$_4$, LiCF$_3$SO$_3$, LiN(CF$_3$SO$_2$)$_2$, LiN(C$_2$F$_5$SO$_2$), LiN(CF$_3$SC(C$_2$F$_5$SO$_2$)$_3$ and the like are exemplified, but the lithium salt is not limited thereto. These materials may be used singly or two or more kinds thereof may be mixed.

The content of the lithium salt is preferably 0.1 to 3.0 mol/L, and particularly preferably 1.0 to 2.0 mol/L. When the content of the lithium salt is 0.1 mol/L or more, the resistance of the electrolyte can be decreased. Thereby, the discharge performance of a battery under large-current/low-temperature conditions can be improved. When the content of the lithium salt is 3.0 mol/L or less, the melting point of the electrolyte can be kept low, enabling the electrolyte to keep a liquid state at room temperature.

The room-temperature-molten salt has, for example, a quaternary ammonium organic cation or an imidazolium cation.

Examples of the quaternary ammonium organic cation include an imidazolium ion such as an ion of dialkylimidazolium or trialkylimidazolium, a tetraalkylammonium ion, an alkylpyridium ion, a pyrazolium ion, a pyrrolidinium ion, and a piperidinium ion. Particularly, the imidazolium cation is preferable.

Examples of the tetraalkylammonium ion include, though are not limited to, a trimethylethylammonium ion, a trimethylpropylammonium ion, a trimethylhexylammonium ion, and a tetrapentylammonium ion.

In addition, examples of an alkyl pyridinium ion include an N-methyl pyridinium ion, an N-ethyl pyridinium ion, an N-propyl pyridinium ion, an N-butyl pyridinium ion, a 1-ethyl-2-methyl pyridinium ion, a 1-butyl-4-methyl pyridinium ion, a 1-butyl-2,4-dimethyl pyridinium ion, and the like, but this is not limiting.

The ambient temperature molten salt having a cation may be used either singly or in combinations of two or more.

Examples of the imidazolium cation include, though are not limited to, a dialkylimidazolium ion, and a trialkylimidazolium ion.

Examples of the dialkylimidazolium ion include, though are not limited to, a 1,3-dimethylimidazolium ion, a 1-ethyl-3-methylimidazolium ion, a 1-methyl-3-ethylimidazolium ion, a 1-methyl-3-butylimidazolium ion, and a 1-butyl-3-methylimidazolium ion.

Examples of the trialkylimidazolium ion include, though are not limited to, a 1,2,3-trimethylimidazolium ion, a 1,2-dimethyl-3-ethylimidazolium ion, a 1,2-dimethyl-3-propylimidazolium ion, and a 1-butyl-2,3-dimethylimidazolium ion.

The ambient temperature molten salts having a cation may be used either singly or in combinations of two or more.

Incidentally, the ambient temperature molten salt having these cations may be used singly, or the ambient temperature molten salt, or two or more kinds thereof may be used mixed.

(5) Container Member

As the container member, a container made of metal of 0.5 mm or less in thickness or a container made of laminate film of 0.2 mm or less in thickness can be used. As the container made of metal, a metal can made of aluminum alloy, iron, stainless or the like in an angular or cylindrical shape can be used. The thickness of the container made of metal is desirably set to 0.2 mm or less.

A multilayer film in which metal foil is coated with a resin film can be used as the laminate film. As the resin, a polymeric resin such as polypropylene (PP), polyethylene (PE), nylon, and polyethylene terephthalate (PET) can be used.

An alloy containing elements such as magnesium, zinc, or silicon is desirable as the aluminum alloy constituting the container made of metal. On the other hand, the content of transition metals such as iron, copper, nickel, and chromium is desirably set to 1% or less. Accordingly, long-term reliability and heat dissipation properties in a high-temperature environment can remarkably be improved.

A metal can made of aluminum or aluminum alloy desirably has the average crystal grain size of 50 μm or less. More desirably, the average crystal grain size is 30 μm or less. Still more desirably, the average crystal grain size is 5 μm or less. By setting the average crystal grain size to 50 μm or less, the strength of the metal can made of aluminum or aluminum alloy can remarkably be increased so that the can be made thinner. As a result, a battery that is light and of high power, excellent in long-term reliability, and suitable for vehicle mounting can be implemented.

(6) Negative Electrode Terminal

The negative electrode terminal can be formed from a material having electric stability and conductivity when the potential with respect to a lithium ion metal is between 0.4 V and 3 V. More specifically, an aluminum alloy containing elements such as Mg, Ti, Zn, Mn, Fe, Cu, and Si and aluminum can be cited. It is desirable for negative electrode terminal to use the same material as that of the negative electrode current collector to reduce the contact resistance.

(7) Positive Electrode Terminal

The positive electrode terminal can be formed from a material having electric stability and conductivity when the potential with respect to a lithium ion metal is between 3 V and 5 V. More specifically, an aluminum alloy containing elements such as Mg, Ti, Zn, Mn, Fe, Cu, and Si and aluminum can be cited. It is desirable for positive electrode terminal to use the same material as that of the positive electrode current collector to reduce the contact resistance.

Next, several examples of the nonaqueous electrolyte battery according to the second embodiment will be described in detail with reference to the drawings.

First, a description will be given regarding a nonaqueous electrolyte battery of Example 1 according to the second embodiment.

Figure 4:
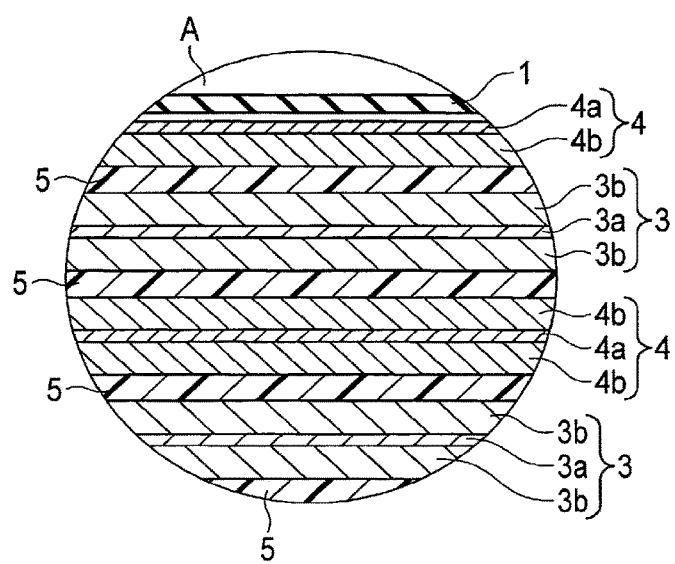
FIG. 4 is an enlarged cross-sectional view of a section A of FIG. 3.

FIG. 3 is a schematic cross-sectional view of a first nonaqueous electrolyte battery according to the second embodiment. FIG. 4 is an enlarged cross-sectional view of a section A of FIG. 3. FIG. 5 is a schematic view illustrating the vicinity of boundaries among a positive electrode, a separator, and a negative electrode in the nonaqueous electrolyte battery of FIG. 3.

A nonaqueous electrolyte battery 10 of Example 1 is provided with a container member 1 and an electrode group 2 as illustrated in FIG. 3. In addition, the nonaqueous electrolyte battery 10 is further provided with a nonaqueous electrolyte (not illustrated).

As illustrated in FIG. 3, the electrode group 2 is housed inside the container member 1 made of a laminate film, for example. As illustrated in FIG. 4, the electrode group 2 has a structure in which a stacked body obtained by stacking a positive electrode 3 and a negative electrode 4 with a separator 5 interposed therebetween is wound in a flat shape. As illustrated in FIG. 4, the positive electrode 3 includes a positive electrode current collector 3a and a positive electrode active material containing-layer 3b which is formed on at least one surface of the positive electrode current collector 3a. In addition, the negative electrode 4 includes a negative electrode current collector 4a and a negative electrode active material containing-layer 4b which is formed on at least one surface of the negative electrode current collector 4a. As illustrated in FIG. 4, the separator 5 is interposed between the positive electrode active material containing-layer 3b and the negative electrode active material containing-layer 4b.

As shown in FIG. 5, the positive electrode active material containing-layer 3b, the negative electrode active material containing-layer 4b, and the separator 5 are porous. The nonaqueous electrolyte is held in a void 3c positioned between the particles of the positive electrode active material P1 in the positive electrode active material containing-layer 3b, a void 4c positioned between the particles of the negative electrode active material P2 in the negative electrode layer 4b, and a void 5a of the separator 5. The separator 5 holding the nonaqueous electrolyte in the void 5a functions as an electrolytic plate. In these voids 3c, 4c, 5a, a polymer having adhesive properties may be held together with the nonaqueous electrolyte.

As shown in FIG. 3, a positive electrode terminal 6 is connected to the positive electrode current collector 3a positioned near the outermost circumference of the electrode group 2. The positive electrode terminal 6 has a band shape and the tip thereof is drawn out from the container member 1. Also, a negative electrode terminal 7 is connected to the negative electrode current collector 4a positioned near the outermost circumference of the electrode group 2. The negative electrode terminal 7 has a band shape and the tip thereof is drawn out from the container member 1. The positive electrode terminal 6 and the negative electrode terminal 7 are drawn from the same side of the container member 1 and the drawing direction of the positive electrode terminal 6 and the drawing direction of the negative electrode terminal 7 are the same.

The negative electrode current collector 4a may be positioned in the outermost layer of the electrode group 2 so that at least a portion of the surface of the outermost layer is coated with an adhesive portion. Accordingly, the electrode group 2 can be bonded to the container member 1.

The nonaqueous electrolyte battery according to the second embodiment is not limited to the configuration illustrated in FIGS. 3 to 5 described above, and can have a configuration, for example, illustrated in, FIGS. 6 and 7 which will be described hereinafter.

Hereinafter, a description will be given regarding a nonaqueous electrolyte battery of Example 2 according to the second embodiment with reference to FIGS. 6 and 7. FIG. 6 is a partially cut perspective view of the nonaqueous electrolyte battery of another example according to the second embodiment. FIG. 7 is an enlarged cross-sectional view of a section B of FIG. 6.

Figure 7:
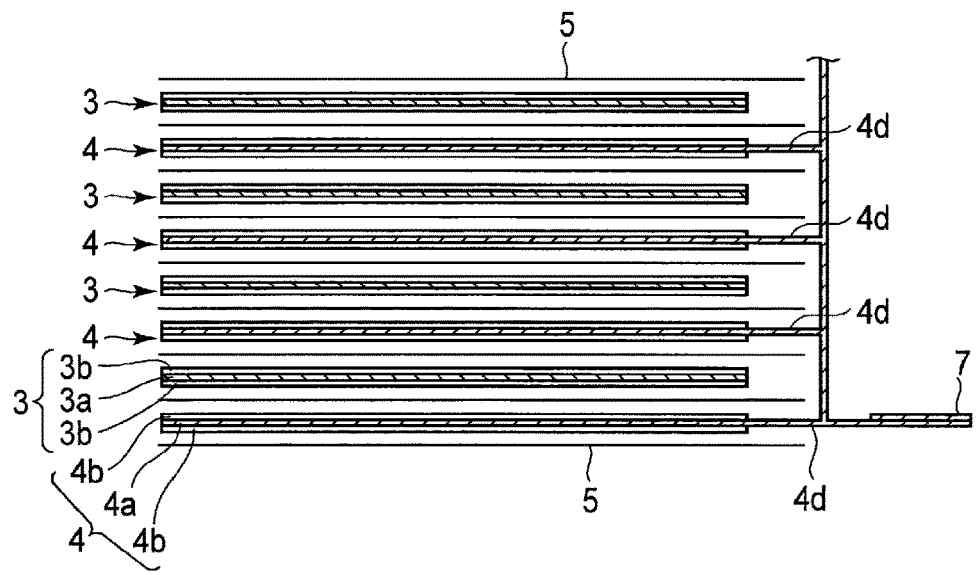
FIG. 7 is an enlarged cross-sectional view of a section B of FIG. 6.

The second exemplary nonaqueous electrolyte battery 10 includes, as shown in FIGS. 6 and 7, the container member 1 and the laminated electrode group 2. Further, the second exemplary nonaqueous electrolyte battery further includes a nonaqueous electrolyte (not shown).

As shown in FIG. 6, the laminated electrode group 2 is housed in the container member 1 made of a laminate film. The laminated electrode group 2 has a structure in which, as shown in FIG. 7, the positive electrode 3 and the negative electrode 4 are alternately laminated by interposing the separator 5 therebetween. There is a plurality of the positive electrodes 3 and each includes the positive electrode current collector 3a and the positive electrode active material containing-layer 3b held on both sides of the positive electrode current collector 3a. There is a plurality of the negative electrodes 4 and each includes the negative electrode current collector 4a and the negative electrode active material containing-layer 4b held on both sides of the negative electrode current collector 4a. A portion 4d of the negative electrode current collector 4a of the negative electrode 4 protrudes from the positive electrode 3. The portion 4d does not hold the negative electrode active material containing-layer 4b on the surface thereof and can work as a negative electrode tab. As shown in FIG. 7, a plurality of negative electrode tabs 4d is electrically connected to the negative electrode terminal 7 in a band shape. Then, the tip of the negative electrode terminal 7 in a band shape is drawn out, as shown in FIG. 6, from the container member 1. Though not illustrated here, the positive electrode current collector 3a of the positive electrode 3 has a side positioned on the opposite side of the negative electrode tab 4d of the negative electrode current collector 4a protruding from the negative electrode 4. A portion protruding from the negative electrode 4 of the positive electrode current collector 3a does not hold the positive electrode active material containing-layer 3b on the surface thereof and can work as a positive electrode tab. A plurality of positive electrode tabs is electrically connected to the positive electrode terminal 6 in a band shape. Then, the tip of the positive electrode terminal 6 in a band shape is drawn out, as shown in FIG. 6, from a side of the container member 1. The direction in which the positive electrode terminal 6 is drawn out from the container member 1 is opposite to the direction in which the negative electrode terminal 7 is drawn out from the container member 1.

In the foregoing, the winding structure as shown in FIGS. 3 and 4 and the laminated structure as shown in FIGS. 6 and 7 are cited as the structure of an electrode group. To provide a high level of safety and reliability, in addition to excellent input/output characteristics, the laminated structure is desirably adopted as the structure of an electrode group. Further, to implement high large-current performance when used for a long period of time, it is desirable to use by adopting the laminated structure of an electrode group including the positive electrode and the negative electrode and folding the separator zigzag.

An example of an electrode group in which the laminated structure is included and the separator is folded zigzag will be described below with reference to FIG. 8.

Figure 8:
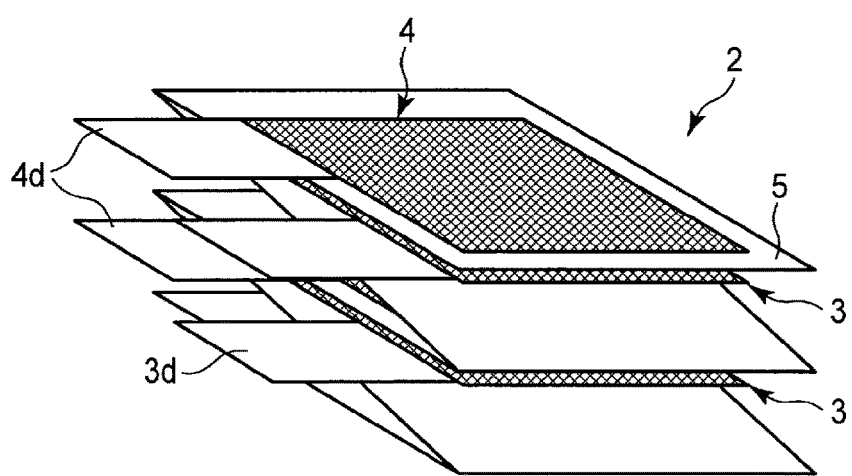
FIG. 8 is a schematic perspective view illustrating an example of an electrode group of the nonaqueous electrolyte battery according to the second embodiment.

FIG. 8 is a schematic perspective view illustrating an example of an electrode group that can be included in the nonaqueous electrolyte battery according to the second embodiment.

An electrode group 2 according to a modified example illustrated in FIG. 8 is provided with a strip-shaped separator 5 which is folded in a zigzag shape. A rectangular negative electrode 4 is stacked on the uppermost layer of the zigzag-shaped separator 5. A rectangular positive electrode 3 and the rectangular negative electrode 4 are alternately inserted into spaces formed by the separators 5 facing each other. A positive electrode tab 3d of a positive electrode current collector 3a and a negative electrode tab 4d of a negative electrode current collector 4a protrude from the electrode group 2 in the same direction. In the electrode group 2 illustrated in FIG. 8, the positive electrode tabs 3d or the negative electrode tabs 4d overlap each other, and the positive electrode tab 3d and the negative electrode tab 4d do not overlap each other in a stacking direction thereof.

The positive electrode tabs 3d of a plurality of the positive electrodes 3 in the electrode group 2 shown in FIG. 8 can be joined to each other. Similarly, the negative electrode tabs 4d of a plurality of the negative electrodes 4 in the electrode group 2 can be joined to each other. A plurality of the positive electrode tabs 3d joined to each other can electrically be connected to, like the battery shown in FIGS. 6 and 7, a positive electrode terminal (not shown). Similarly, a plurality of the negative electrode tabs 4d joined to each other can electrically be connected to, like the battery shown in FIGS. 6 and 7, a negative electrode terminal (not shown).

FIG. 8 illustrates the electrode group 2 including the two positive electrodes 3 and the two negative electrodes 4. However, the numbers of the positive electrodes 3 and the negative electrodes 4 can freely be changed depending on purposes and uses. In addition, the protruding directions of the positive electrode tab 3d and the negative electrode tabs 4d from the electrode group 2 do not need to be the same as shown in FIG. 8 and may be directions forming, for example, about 90° or 180° to each other.

The nonaqueous electrolyte battery according to the second embodiment includes the electrode according to the first embodiment. Thus, the nonaqueous electrolyte battery according to the second embodiment can exhibit an excellent input and output characteristic under a high current, and an excellent cycle life characteristic.

Third Embodiment

The battery pack is provided according to the third embodiment. This battery pack includes the nonaqueous electrolyte battery according to the second embodiment.

The battery pack according to the third embodiment can be provided with one or a plurality of the nonaqueous electrolyte batteries (unit cells) according to the second embodiment. The plurality of nonaqueous electrolyte batteries included in the battery pack can also form a battery module by being electrically connected to in series, in parallel, or with a combination of series connection and parallel connection. The battery pack may include a plurality of battery modules.

The battery pack according to the third embodiment may further comprise a protective circuit. The protective circuit has a function to control charging and discharging of the nonaqueous electrolyte battery. Alternatively, a circuit included in an equipment where the battery pack serves as a power source (for example, electronic devices, vehicles, and the like) may be used as the protective circuit for the battery pack.

Moreover, the battery pack according to the third embodiment may further comprise an external power distribution terminal. The external power distribution terminal is configured to externally output the current from the nonaqueous electrolyte battery, and to input the current to the nonaqueous electrolyte battery. In other words, when the battery pack is used as a power source, the current is externally provided via the external power distribution terminal. Also, when the battery pack is charged, the charging current (including regenerative energy caused by power of vehicles such as automobiles) is provided to the battery pack via the external power distribution terminal.

Next, an example of the battery pack according to the third embodiment will be described with reference to the drawings.

Figure 9:
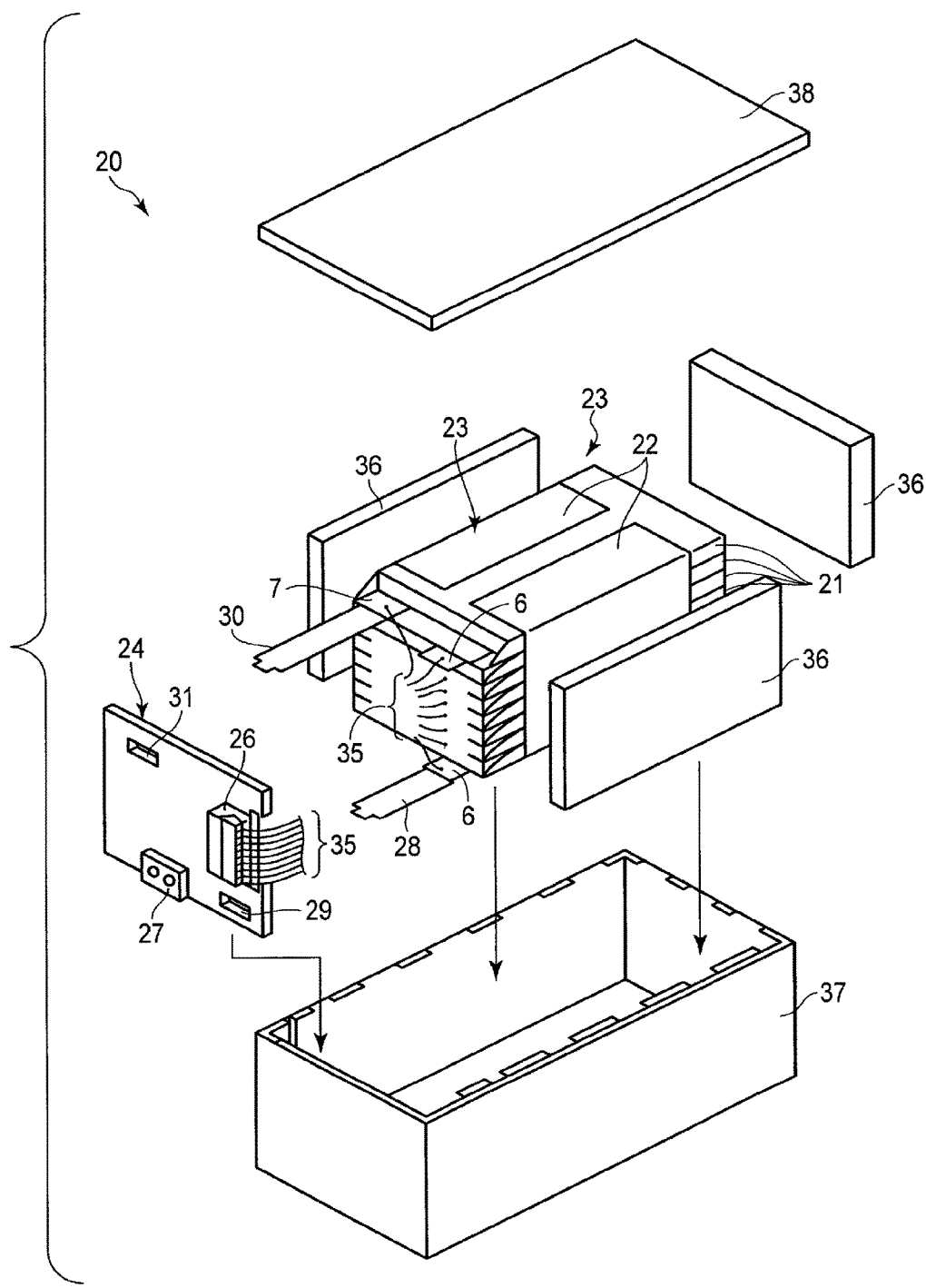
FIG. 9 is an exploded perspective view illustrating an example of a battery pack according to a third embodiment.

FIG. 9 is an exploded perspective view of a battery pack. FIG. 10 is a block diagram showing the electric circuit of the battery pack of FIG. 9.

A battery pack 20 shown in FIGS. 9 and 10 includes a plurality of unit cells 21. The plurality of unit cells 21 is the nonaqueous electrolyte battery 10 in a flat shape described with reference to FIGS. 3 to 5.

The plurality of unit cells 21 constitutes a battery module 23 by being laminated such that the positive electrode terminal 6 and the negative electrode terminal 7 extending to the outside are aligned in the same direction and fastened by an adhesive tape 22. As shown in FIG. 10, these unit cells 21 are electrically connected to each other in series.

A printed wiring board 24 is arranged opposite to a side surface of the battery module 23 from which the positive electrode terminal 6 and the negative electrode terminal 7 extend. As shown in FIG. 10, a thermistor 25, a protective circuit 26, and an energizing terminal 27 as an external power distribution terminal to external devices are mounted on the printed wiring board 24. An insulating plate (not shown) to avoid unnecessary connection to wires of the battery module 23 is mounted on the surface where the printed wiring board 24 is opposite to the battery module 23.

A positive electrode lead 28 is connected to the positive electrode terminal 6 positioned in the bottom layer of the battery module 23 and the tip thereof is inserted into a positive electrode connector 29 of the printed wiring board 24 for electric connection. A negative electrode lead 30 is connected to the negative electrode terminal 7 positioned in the top layer of the battery module 23 and the tip thereof is inserted into a negative electrode connector 31 of the printed wiring board 24 for electric connection. These connectors 29, 31 are connected to the protective circuit 26 through wires 32, 33 formed on the printed wiring board 24 respectively.

The thermistor 25 detects the temperature of the unit cell 21. A detection signal thereof is sent to the protective circuit 26. The protective circuit 26 can cut off a positive-side wire 34*a* and a negative-side wire 34*b* between the protective circuit 26 and the energizing terminal 27 under a predetermined condition. The predetermined condition is, for example, when the temperature detected by the thermistor 25 is equal to a predetermined temperature or higher. Another example of the predetermined condition is when an over-charge, an over-discharge, an over-current or the like of the unit cell 21 is detected. The over-charge, the over-discharge, the over-current or the like is detected for each of the unit cells 21 or for the battery module 23 as a whole. When detected for each of the unit cells 21, the battery voltage may be detected or the positive electrode potential or negative electrode potential may be detected. In the latter case, a lithium electrode used as a reference electrode is inserted into each of the unit cells 21. In the case of the battery pack 20 shown in FIGS. 9 and 10, a wire 35 for voltage detection is connected to each of the unit cells 21 and detection signal is sent to the protective circuit 26 through the wire 35.

Protective sheets 36 comprised of rubber or resin are arranged on three side surfaces of the battery module 23 except the side surface from which the positive electrode terminal 6 and the negative electrode terminal 7 are protruded.

The battery module 23 is housed in a housing container 37 together with each of the protective sheets 36 and the printed wiring board 24. That is, the protective sheets 36 are arranged on both internal surfaces in a long side direction of the housing container 37 and on one of the internal surface at the opposite side in a short side direction. The printed wiring board 24 is arranged on the other internal surface in a short side direction. The battery module 23 is located in a space surrounded by the protective sheets 36 and the printed wiring board 24. A lid 38 is attached to the upper surface of the housing container 37.

Incidentally, a heat-shrinkable tape may be used instead of an adhesive tape 22 in order to fix the battery module 23. In this case, protective sheets are arranged on both sides of the battery module, the heat-shrinkable tape is wrapped therearound, and then, the heat-shrinkable tape is subjected to heat shrinkage to bind the battery module.

Although FIGS. 9 and 10 illustrate a mode in which the plurality of unit cells 21 are connected in series, the plurality of unit cells 21 may be connected in parallel in order to increase a battery capacity. Alternatively, a series connection and parallel connection may be combined. It is also possible to further connect the assembled battery packs in series or in parallel.

In addition, an aspect of the battery pack according to the third embodiment may be suitably changed according to the application. The battery pack is suitably used for an application which requires an excellent cycle characteristic when a high current is taken out. To be specific, for example, the battery pack is used as a power source for a digital camera and as a battery for a vehicle such as a two- or four-wheeled hybrid electric vehicle, a two- or four-wheeled electric vehicle, and an assisted bicycle. In particular, the battery pack is suitably used as a battery for a vehicle.

Incidentally, the battery pack is preferably used for an application which requires a high temperature characteristic when a mixture solvent obtained by mixing at least two or more kinds selected from a group including propylene carbonate (PC), ethylene carbonate (EC), and γ-butyrolactone (GBL), or γ-butyrolactone (GBL) is included in the nonaqueous electrolyte. To be specific, the above-described application for a vehicle is exemplified.

In a vehicle having the battery pack according to the third embodiment mounted, the battery pack is configured to, for example, recover regenerative energy caused by power of the vehicle. Examples of the vehicle include two to four-wheeled hybrid electric automobiles, two to four-wheeled electric automobiles, electric assist bicycles, and electric trains.

The battery pack according to the third embodiment is provided with the nonaqueous electrolyte battery according to the second embodiment. Therefore, the battery pack according to the third embodiment can exhibit an excellent input and output characteristic under a high current, and excellent cycle life characteristic.

Fourth Embodiment

The vehicle according to the fourth embodiment includes the battery pack according to the third embodiment. Herein, examples of the vehicle can include a hybrid electric vehicle with two to four wheels, which uses a combination of an internal combustion engine and a battery drive electric motor as a running power source, an electric vehicle with two to four wheels, which uses only the battery drive electric motor as the running power source, an assisted bicycle in which the battery drive electric motor is combined with human power, and the like.

Power sources with a wide range of rotational speeds and torques are required according to running conditions for driving of an automobile. In general, internal combustion engines are limited in torque and rotational speed at which the ideal energy efficiency is obtained, and thus, the energy efficiency thereof is reduced in operating conditions other than such a limited condition. A hybrid type automobile has a characteristic that the energy efficiency of the entire automobile can be improved by operating an internal combustion engine thereof under an optimum condition to generate power and further driving the wheels by a highly efficient electric motor, or driving an automobile by the combined motive power of an internal combustion engine and an electric motor. In addition, it is possible to drastically increase the mileage per unit fuel by recovering the kinetic energy of the vehicle as electric power at the time of deceleration as compared to an automobile which runs solely on a general internal combustion engine.

An electric vehicle (EV) runs using energy stored in a battery pack which is charged by power supplied from the outside of the automobile. Accordingly, such electric vehicle can use the electric energy which is generated with high efficiency using another power generation facility or the like. In addition, the kinetic energy of the automobile can be recovered as electric power at the time of deceleration, and thus, it is possible to increase the energy efficiency at the time of running. The electric vehicle does not discharge carbon dioxide and other exhaust gases at all, and thus, is a clean automobile. On the other hand, the motive power for running is obtained entirely from the electric motor, and thus, a high-output electric motor is required. In general, it is necessary to enable running by storing the total energy which is required for one-time running in a battery pack with a one-time charge, and thus, a battery having an extremely large capacity is required. It is desirable to set a rated capacity of the battery pack to be within a range of 100 to 500 Ah. A more preferable range is 200 to 400 Ah.

In addition, a charger having a large capacity and a charging cable are required to charge a large amount of power corresponding to one-time running during a short period of time. Thus, it is desirable that the electric vehicle be provided with a charging connector that connects such members. It is possible to use a general connector using an electrical contact as the charging connector, but a non-contact charging connector using electromagnetic coupling may also be used.

FIG. 11 illustrates an example of a vehicle according to the fourth embodiment. As illustrated in FIG. 11, an automobile 41 according to the fourth embodiment has an engine room in which a battery pack 42 according to the third embodiment is mounted. When the battery pack is installed in the engine room of the automobile, which is under a high-temperature environment, a distance from the battery pack to an electrically driven device such as a motor or an inverter is decreased, a loss in input and output is reduced, and fuel efficiency is improved. The mounting position is not limited to engine rooms. For example, the battery pack may also be mounted in rear parts of automobiles or under seats.

Since the battery pack according to the third embodiment is provided according to the fourth embodiment, it is possible to provide a vehicle such as an automobile in which an electrochemical device capable of exhibiting the input and output characteristics under a high current, and cycle life characteristic is mounted.

EXAMPLE

Hereinafter, the embodiments will be described in more detail with examples, but the embodiments are not limited to the Examples listed below without departing from the spirit of the invention.

Incidentally, measurement of an average particle diameter of active material particles or conductive agent particles is performed using a laser diffraction-type particle size distribution measuring instrument (Microtrack MT3000 manufactured by Nikkiso Co., Ltd.) as a device and using the method of measuring the particle diameter that has been described in the first embodiment.

Example 1

Manufacture of Positive Electrode

First, lithium cobalt oxide ($LiCoO_2$) powder of 90 mass %, acetylene black of 3 mass %, graphite of 3 mass % and polyvinylidene fluoride (PVdF) of 4 mass % were added, as the positive electrode active material particles, with N-methylpyrrolidone (NMP), and the resultant was mixed to obtain a slurry. This slurry was applied on both surfaces of the current collector made of an aluminum foil having a thickness of 15 µm and an average crystal particle diameter of 30 µm, and then, was subjected to drying and pressing, thereby manufacturing a positive electrode having an electrode density of 3.0 g/cm$^3$.

<Manufacture of Negative Electrode>

As the negative electrode active material particles, $Nb_2TiO_7$ was prepared in which an average particle diameter of the primary particles was 1 µm, an average particle diameter of the secondary particles was 10 µm and a lithium inserting-and-extracting potential was noble by more than 1.0 V with respect to a potential of lithium metal. This negative electrode active material particles, acetylene black serving as the conductive material, carboxymethyl cellulose serving as a binder, styrene-butadiene rubber serving as a binder, and sodium carbonate serving as the pH adjusting agent were mixed while adding pure water such that the mass ratio became 93:4:1:1:1, respectively, thereby preparing a slurry. Incidentally, a solution having a viscosity of 3000 mPa·s was used as a 1% aqueous solution of carboxymethyl cellulose. The obtained slurry was applied to an aluminum foil having a thickness of 15 μm and an average crystal particle diameter of 30 μm, and then was dried. The negative electrode after drying had an electrode density of 2.85 g/cm³. In addition, an average particle diameter of the primary particles was 1 μm, and an average particle diameter of the secondary particles was 10 μm when an average particle diameter of active material particles of the negative electrode was measured.

manufacturing condition of the negative electrode was changed. In addition, the average particle diameter of the primary particles of the active material particles and the average particle diameter of the secondary particles in the negative electrode are described in Table 1. In Table 1, "pH" indicates a value which is measured according to the method that has been described in the first embodiment, and "CMC 1% viscosity (mPa·s)" indicates a viscosity in a 1% aqueous solution of carboxymethyl cellulose.

TABLE 1

| | active material particle | primary particle diameter (μm) | secondary particle diameter (μm) | pH | pH adjusting agent | CMC 1% viscosity (P) | electrode density (g/cc) |
|---|---|---|---|---|---|---|---|
| Example 1 | $Nb_2TiO_7$ | 1 | 10 | 7.4 | sodium carbonate | 3000 | 2.8 |
| Example 2 | $Nb_2TiO_7$ | 1 | 10 | 8 | sodium carbonate | 1000 | 2.8 |
| Example 3 | $Nb_2TiO_7$ | 1 | 10 | 7.4 | sodium carbonate | 1000 | 2.8 |
| Example 4 | $Nb_2TiO_7$ | 1 | 10 | 7.6 | sodium carbonate | 1000 | 2.8 |
| Example 5 | $Nb_2TiO_7$ | 1 | 10 | 7.6 | sodium carbonate | 1000 | 2.8 |
| Example 6 | $Nb_2TiO_7$ | 1 | 10 | 7.4 | sodium carbonate | 5000 | 2.8 |
| Example 7 | $Nb_2TiO_7$ | 1 | 10 | 7.1 | sodium carbonate | 1000 | 2.8 |
| Example 8 | $Nb_2TiO_7$ | 1 | 10 | 7.8 | sodium carbonate | 1000 | 2.8 |
| Example 9 | $Nb_2TiO_7$ | 1 | 10 | 7.8 | sodium carbonate | 1000 | 2.8 |
| Comparative Example 1 | $Nb_2TiO_7$ | 1 | 10 | 7.4 | — | 100 | 2.8 |
| Comparative Example 2 | $Nb_2TiO_7$ | 1 | 10 | 7 | — | 10000 | 2.8 |
| Comparative Example 3 | $Nb_2TiO_7$ | 1 | 10 | 7.5 | — | 1000 | 2.8 |
| Comparative Example 4 | $Nb_2TiO_7$ | 1 | 10 | 7.2 | — | 1000 | 2.8 |
| Comparative Example 5 | $Nb_2TiO_7$ | 1 | 10 | 7.7 | — | 1000 | 2.8 |

<Manufacture of Battery Cell>

A three-electrode cell was manufactured according to the method to be described hereinafter, and a discharge capacity retention rate (output characteristic) and a discharge capacity retention rate (cycle life characteristic) were measured.

The negative electrode was cut into a size of 2×2 cm, and set as a working electrode. The positive electrode was cut into a size of 2×2 cm, and set as a counter electrode. The working electrode and the counter electrode were set to oppose each other with a glass filter (separator) interposed therebetween. Further, the lithium metal was inserted, as the reference electrode, into to the glass filter so as not to be in contact with the working electrode and the counter electrode. These electrodes were put into a three-electrode glass cell, and each of the working electrode, the counter electrode, and the reference electrode was connected to each terminal of the glass cell.

Meanwhile, lithium hexafluorophosphate ($LiPF_6$) of 1 mol/L was dissolved in a solvent in which ethylene carbonate and diethyl carbonate are mixed with a volume ratio of 1:2, thereby preparing an electrolyte.

The prepared electrolyte of 25 mL was poured on the glass cell to cause the separator and the respective electrodes to be sufficiently impregnated with the electrolyte. In this state, the glass cell was sealed, thereby manufacturing the battery cell.

Examples 2 to 9 and Comparative Examples 1 to 5

As shown in the following Table 1, each battery cell was prepared in the same manner as in Example 1 except that a <Evaluation>

Each glass cell manufactured in Example 2 to 9 and Comparative Example 1 to 5 was arranged inside a thermostatic bath at 25° C., and was subjected to an output characteristic evaluation. Here, a charge-and-discharge test was performed by changing a current density of a discharge side to 0.2, 1.0, 2.0, 3.0, 4.0 and 5.0 C while setting that of a charge side to be constant at 1.0 C.

In addition, each cell for evaluation was arranged inside the thermostatic bath at 25° C., and was subjected to a cycle characteristic evaluation. A cycle test was performed by setting a charge at 1.0 C and discharge at 1.0 C as one cycle, and measuring a discharge capacity at each discharge. In addition, the cell for evaluation was allowed to stand for 10 minutes after each charge and each discharge.

<Method of Measuring Pore Diameter Distribution According to Mercury Porosimetry>

Further, a negative electrode was taken out from each battery cell after being evaluated. The taken-out negative electrode was washed and dried as described above. A sample piece having a size of 50×50 mm was cut out from the dried negative electrode, and the mass of the sample of the negative electrode according to each of Examples was set to 1 g.

The sample piece sampled as above was subjected to pore diameter distribution measurement according to mercury porosimetry. Autopore 9520, manufactured by Shimadzu Corporation, was used as the measurement device of pore diameter distribution. In this manner, each pore diameter distribution curve of a negative electrode active material containing-layer of each electrode was obtained.

FIG. 12 illustrates the pore diameter distribution curve (log differential distribution curve) of the negative electrode active material containing-layer according to Example 5 obtained by mercury porosimetry.

As apparent from the pore diameter distribution curve illustrated in FIG. 12, the negative electrode active material containing-layer according to Example 5 had a first peak PE1 which has a maximum value within a range of 0.01 to 2 μm and a second peak PE2 which has a maximum value within a range of exceeding 6 μm and equal to or smaller than 20 μm. In addition, an intensity of the second peak PE2 was 1/10 to 1/5 of an intensity of the first peak PE1.

value in the log differential distribution curve as the peak position. In addition, the peak intensity was calculated from an intrusion volume of mercury.

In addition, Table 2 shows the discharge capacity retention rate (output characteristic) and the discharge capacity retention rate (cycle life characteristic) of each cell according to Examples 1 to 9 and Comparative Examples 1 to 5. To be specific, the column of the discharge capacity retention rate (output characteristic) represents a relative value of discharge capacity at each rate when a discharge capacity at 0.2 C is set as 100%. In addition, the column of the discharge capacity retention rate (cycle life characteristic) represents each relative value of discharge capacity at the 45-th cycle and at the 90-th cycle when a discharge capacity at the first cycle is set as 100%.

TABLE 2

|  | first peak (μm) | second peak (μm) | intensity ratio | Discharge capacity retention rate (output characteristic) |  |  |  |  |  | discharge capacity retention rate (cycle life characteristic) |  |  |
| --- | --- | --- | --- | --- | --- | --- | --- | --- | --- | --- | --- | --- |
|  |  |  |  | 0.2 C | 1 C | 2 C | 3 C | 4 C | 5 C | 1cyc | 45cyc | 90cyc |
| Example 1 | 0.09 | 10 | 1/8 | 100% | 96.70% | 90.30% | 73.80% | 58.20% | 44.60% | 100% | 89.60% | 79.60% |
| Example 2 | 0.2 | 10 | 1/8 | 100% | 96.50% | 89.70% | 74.50% | 57.70% | 44.10% | 100% | 87.30% | 77.00% |
| Example 3 | 0.4 | 10 | 1/8 | 100% | 96.70% | 92.00% | 78.40% | 63.40% | 48.90% | 100% | 89.80% | 79.80% |
| Example 4 | 0.1 | 6.1 | 1/8 | 100% | 96.50% | 92.70% | 79.90% | 65.60% | 51.50% | 100% | 88.10% | 77.90% |
| Example 5 | 0.1 | 10 | 1/8 | 100% | 96.90% | 93.20% | 82.90% | 68.30% | 53.70% | 100% | 89.90% | 79.90% |
| Example 6 | 0.1 | 15 | 1/8 | 100% | 96.70% | 93.20% | 81.90% | 66.10% | 51.90% | 100% | 89.70% | 79.60% |
| Example 7 | 0.1 | 10 | 1/10 | 100% | 91.80% | 88.30% | 77.00% | 61.20% | 47.00% | 100% | 85.40% | 73.10% |
| Example 8 | 0.1 | 10 | 1/8 | 100% | 92.00% | 88.50% | 77.20% | 61.40% | 47.20% | 100% | 86.40% | 74.50% |
| Example 9 | 0.1 | 10 | 1/5 | 100% | 93.70% | 90.20% | 78.90% | 63.10% | 48.90% | 100% | 90.00% | 80.00% |
| Comparative Example 1 | 0.1 | 4 | 1/8 | 100% | 88.10% | 80.90% | 65.40% | 45.60% | 29.80% | 100% | 81.40% | 64.20% |
| Comparative Example 2 | 0.1 | 21 | 1/8 | 100% | 84.50% | 71.80% | 55.50% | 33.80% | 13.00% | 100% | 64.50% | 47.40% |
| Comparative Example 3 | 0.1 | — | 1/8 | 100% | 84.50% | 75.40% | 51.80% | 31.50% | 14.20% | 100% | 50.40% | 30.10% |
| Comparative Example 4 | 0.1 | 10 | 1/20 | 100% | 86.30% | 75.10% | 54.00% | 35.20% | 16.40% | 100% | 59.20% | 34.50% |
| Comparative Example 5 | 0.1 | 10 | 1/3 | 100% | 88.40% | 76.10% | 61.90% | 44.90% | 27.40% | 100% | 83.40% | 65.10% |

In addition, FIG. 13 illustrates the pore diameter distribution curve of the negative electrode active material containing-layer according to Comparative Example 5 obtained by mercury porosimetry.

As apparent from the pore diameter distribution curve illustrated in FIG. 13, the negative electrode active material containing-layer according to Comparative Example 5 had a first peak PE3 which has a maximum value within a range of 0.01 to 2 μm and a second peak PE4 which has a maximum value within a range of exceeding 6 μm and equal to or smaller than 20 μm. However, an intensity of the second peak PE4 was greater than 1/5 of an intensity of the first peak PE3.

<Result>

The following Table 2 shows the density of the negative electrodes according to Examples 1 to 9 and Comparative Examples 1 to 5, and the first peak and second peak, and a proportion (intensity ratio) of an intensity of the second peak in relation to an intensity of the first peak of the negative electrode active material containing-layers obtained by the pore diameter distribution measurement according to mercury porosimetry. The first peak and the second peak in Table 2 represents each pore diameter at peak tops of the log differential distribution.

Incidentally, a position of the peak was obtained by setting a value of pore diameter (μm) at a point at which a log differential pore volume (mL/g) indicates the largest It is understood that the excellent output characteristic and cycle life characteristic can be achieved when the active material particles contain the niobium titanium composite oxide, the pore diameter distribution of the negative electrode active material containing-layer obtained by the mercury porosimetry has a first peak, which has the maximum value within the range of 0.01 to 2 μm, and a second peak, which has the maximum value within the range of exceeding 6 μm and equal to or smaller than 20 μm, and further, the intensity of the second peak is 1/10 to 1/5 the intensity of the first peak, from results shown in Table 2. It is understood that both an excellent output characteristic and cycle life characteristic can be achieved particularly when the intensity of the second peak is 1/8 to 1/5 the intensity of the first peak.

On the other hand, it is understood that both the output characteristic and cycle life characteristic deteriorate in any one of the cell according to Comparative Example 1 in which the second peak is equal to or smaller than 6 μm, the cell according to Comparative Example 2 in which the second peak exceeds 20 μm, the cell according to Comparative Example 3 in which the second peak is not present, the cell according to Comparative Example 4 in which the intensity of the second peak is lower than 1/10 the intensity of the first peak, and the cell according to Comparative Example 5 in which the intensity of the second peak exceeds 1/5 the intensity of the first peak when compared to the cells according to Example 1 to 9.

Examples 10 to 18 and Comparative Examples 6 to 10

As shown in the following Table 3, each battery cell was prepared in the same manner as in Example 1 except that the kind of the active material particles used in the negative electrode and a manufacturing condition of the negative electrode is changed. In addition, the average particle diameter of the primary particles of the active material particles and the average particle diameter of the secondary particles in the negative electrode are described in Table 3. In Table 3, "pH" indicates a value which is measured according to the method that has been described in the first embodiment, and "CMC 1% viscosity (mPa·s)" indicates a viscosity in a 1% aqueous solution of carboxymethyl cellulose.

<Evaluation>

Each cell for evaluation according to Examples 10 to 18 and Comparative Examples 6 to 10 was subjected to evaluation of the output characteristic and the cycle life characteristic in the same procedure as in Example 1.

In addition, each negative electrode active material containing-layer of the electrodes according to Examples 10 to 18 and Comparative Examples 6 to 10 after being evaluated was subjected to pore diameter distribution measurement according to mercury porosimetry in the same manner as in Example 1.

<Result>

The following Table 4 shows the density of the negative electrodes according to Examples 10 to 18 and Comparative Examples 6 to 10, and the first peak and second peak, and

TABLE 3

| | active material particle | primary particle diameter (μm) | secondary particle diameter (μm) | pH | pH adjusting agent | CMC 1% viscosity (P) | electrode density (g/cc) |
|---|---|---|---|---|---|---|---|
| Example 10 | $Li_2(Sr_{0.5}Na_{0.5})Ti_{5.5}Nb_{0.5}O_{14}$ | 1 | 10 | 8.2 | sulfuric acid | 3000 | 2.5 |
| Example 11 | $Li_2(Sr_{0.5}Na_{0.5})Ti_{5.5}Nb_{0.5}O_{14}$ | 1 | 10 | 8.2 | sulfuric acid | 1000 | 2.5 |
| Example 12 | $Li_2(Sr_{0.5}Na_{0.5})Ti_{5.5}Nb_{0.5}O_{14}$ | 1 | 10 | 7.7 | sulfuric acid | 1000 | 2.5 |
| Example 13 | $Li_2(Sr_{0.5}Na_{0.5})Ti_{5.5}Nb_{0.5}O_{14}$ | 1 | 10 | 8.6 | sulfuric acid | 1000 | 2.5 |
| Example 14 | $Li_2(Sr_{0.5}Na_{0.5})Ti_{5.5}Nb_{0.5}O_{14}$ | 1 | 10 | 7.9 | sulfuric acid | 1000 | 2.5 |
| Example 15 | $Li_2(Sr_{0.5}Na_{0.5})Ti_{5.5}Nb_{0.5}O_{14}$ | 1 | 10 | 7.9 | sulfuric acid | 5000 | 2.5 |
| Example 16 | $Li_2(Sr_{0.5}Na_{0.5})Ti_{5.5}Nb_{0.5}O_{14}$ | 1 | 10 | 8.1 | sulfuric acid | 1000 | 2.5 |
| Example 17 | $Li_2(Sr_{0.5}Na_{0.5})Ti_{5.5}Nb_{0.5}O_{14}$ | 1 | 10 | 8.1 | sulfuric acid | 2000 | 2.5 |
| Example 18 | $Li_2(Sr_{0.5}Na_{0.5})Ti_{5.5}Nb_{0.5}O_{14}$ | 1 | 10 | 8 | sulfuric acid | 1000 | 2.5 |
| Comparative Example 6 | $Li_2(Sr_{0.5}Na_{0.5})Ti_{5.5}Nb_{0.5}O_{14}$ | 1 | 10 | 7.9 | sulfuric acid | 100 | 2.5 |
| Comparative Example 7 | $Li_2(Sr_{0.5}Na_{0.5})Ti_{5.5}Nb_{0.5}O_{14}$ | 1 | 10 | 8 | sulfuric acid | 10000 | 2.5 |
| Comparative Example 8 | $Li_2(Sr_{0.5}Na_{0.5})Ti_{5.5}Nb_{0.5}O_{14}$ | 1 | 10 | 7.6 | sulfuric acid | 1000 | 2.5 |
| Comparative Example 9 | $Li_2(Sr_{0.5}Na_{0.5})Ti_{5.5}Nb_{0.5}O_{14}$ | 1 | 10 | 7.5 | sulfuric acid | 1000 | 2.5 |
| Comparative Example 10 | $Li_2(Sr_{0.5}Na_{0.5})Ti_{5.5}Nb_{0.5}O_{14}$ | 1 | 10 | 8.7 | sulfuric acid | 1000 | 2.5 |

<Manufacture of Cell for Evaluation>

Each three-electrode cell for evaluation according to Examples 10 to 18 and Comparative Examples 6 to 10 was manufactured in the same procedure as in Example 1, except that each negative electrode according to Examples 10 to 18 and Comparative Examples 6 to 10 was used, in order to evaluate the output characteristic and the cycle life characteristic.

proportion (intensity ratio) of the second peak intensity in relation to the first peak intensity of the negative electrode active material containing-layers obtained by the pore diameter distribution measurement according to mercury porosimetry. The first peak and second peak in Table 4 represent the pore diameter at peak tops of the log differential distribution.

TABLE 4

| | first peak (μm) | second peak (μm) | intensity ratio | Discharge capacity retention rate (output characteristic) | | | | | | discharge capacity retention rate (cycle life characteristic) | | |
|---|---|---|---|---|---|---|---|---|---|---|---|---|
| | | | | 0.2 C | 1 C | 2 C | 3 C | 4 C | 5 C | 1cyc | 45cyc | 90cyc |
| Example 10 | 0.09 | 10 | 1/8 | 100% | 98.40% | 96.00% | 95.10% | 83.90% | 71.90% | 100% | 85.60% | 54.60% |
| Example 11 | 0.2 | 10 | 1/8 | 100% | 98.60% | 95.80% | 94.90% | 85.80% | 73.80% | 100% | 83.30% | 52.00% |
| Example 12 | 0.4 | 10 | 1/8 | 100% | 98.30% | 96.70% | 95.40% | 86.10% | 74.10% | 100% | 85.80% | 54.80% |
| Example 13 | 0.1 | 6.1 | 1/8 | 100% | 98.70% | 96.00% | 93.20% | 87.50% | 77.50% | 100% | 84.10% | 52.90% |
| Example 14 | 0.1 | 10 | 1/8 | 100% | 98.50% | 95.80% | 93.40% | 88.90% | 78.90% | 100% | 85.90% | 54.90% |
| Example 15 | 0.1 | 15 | 1/8 | 100% | 98.20% | 95.70% | 94.80% | 88.60% | 78.60% | 100% | 85.70% | 54.60% |
| Example 16 | 0.1 | 10 | 1/10 | 100% | 98.80% | 96.30% | 93.90% | 86.40% | 74.40% | 100% | 81.40% | 48.10% |
| Example 17 | 0.1 | 10 | 1/8 | 100% | 98.00% | 96.30% | 95.00% | 86.40% | 75.40% | 100% | 82.40% | 49.50% |
| Example 18 | 0.1 | 10 | 1/5 | 100% | 98.50% | 97.00% | 94.80% | 89.10% | 79.10% | 100% | 86.00% | 55.00% |
| Comparative Example 6 | 0.1 | 4 | 1/8 | 100% | 97.50% | 92.40% | 87.10% | 77.70% | 63.40% | 100% | 69.40% | 39.20% |
| Comparative Example 7 | 0.1 | 21 | 1/8 | 100% | 95.50% | 90.80% | 84.40% | 72.10% | 58.40% | 100% | 62.50% | 32.40% |
| Comparative Example 8 | 0.1 | — | 1/8 | 100% | 93.50% | 86.80% | 77.20% | 61.50% | 45.40% | 100% | 58.40% | 25.10% |

TABLE 4-continued

|  | first peak (μm) | second peak (μm) | intensity ratio | Discharge capacity retention rate (output characteristic) | | | | | | discharge capacity retention rate (cycle life characteristic) | | |
| --- | --- | --- | --- | --- | --- | --- | --- | --- | --- | --- | --- | --- |
|  |  |  |  | 0.2 C | 1 C | 2 C | 3 C | 4 C | 5 C | 1cyc | 45cyc | 90cyc |
| Comparative Example 9 | 0.1 | 10 | 1/20 | 100% | 94.50% | 87.70% | 82.40% | 69.40% | 55.70% | 100% | 67.20% | 29.50% |
| Comparative Example 10 | 0.1 | 10 | 1/3 | 100% | 96.50% | 93.40% | 89.10% | 79.70% | 66.40% | 100% | 71.40% | 40.10% |

It is understood that an excellent output characteristic and cycle life characteristic can be achieved when the active material particles contains $Li_2(Sr_{0.5}Na_{0.5})Ti_{5.5}Nb_{0.5}O_{14}$, the pore diameter distribution of the negative electrode active material containing-layer obtained by mercury porosimetry has a first peak, which has the maximum value within the range of 0.01 to 2 μm, and a second peak, which has the maximum value within the range exceeding 6 μm and equal to or smaller than 20 μm, and further, the intensity of the second peak is $1/10$ to $1/5$ the intensity of the first peak, from the results shown in Table 4. It is understood that both an excellent output characteristic and excellent cycle life characteristic can be achieved particularly in the cell according to Example 18.

On the other hand, it is understood that both the output characteristic and the cycle life characteristic deteriorate in any one of the cell according to Comparative Example 6 in which the second peak is equal to or smaller than 6 μm, the cell according to Comparative Example 7 in which the second peak exceeds 21 μm, the cell according to Comparative Example 8 in which the second peak is not present, the cell according to Comparative Example 9 in which the intensity of the second peak is lower than $1/10$ of the intensity of the first peak, and the cell according to Comparative Example 10 in which the intensity of the second peak exceeds $1/5$ the intensity of the first peak when compared to the cells according to Example 10 to 18.

The negative electrode is provided according to at least one of the embodiments and Examples that have been described above. The negative electrode includes active material particles containing at least one selected from niobium titanium composite oxide and a composite oxide which is expressed by the general formula $Li_xM1_{1-y}M2_yTi_{6-z}M3_zO_{14+\delta}$. The active material particles includes a primary particles having an average particle diameter within the range of 0.1 to 10 μm and a secondary particles having an average particle diameter within the range of 1 to 30 μm. A pore diameter distribution of a negative electrode active material containing-layer which is obtained by mercury porosimetry has a first peak which has a maximum value within the range of 0.01 to 2 μm and a second peak which has a maximum value within the range exceeding 6 μm and equal to or smaller than 20 μm. The intensity of the second peak is $1/10$ to $1/5$ an intensity of the first peak.

This negative electrode active material containing-layer can obtain both an excellent impregnation property of the nonaqueous electrolyte and an excellent electrical conduction between the active material particles, and further, to prevent the occlusion of pores and breakage of the negative electrode active material containing-layer caused by repeated charge and discharge. As a result, the negative electrode according to the first embodiment can realize a nonaqueous electrolyte battery which is excellent in the input and output characteristics under a high current, and excellent cycle life characteristic.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrode comprising: a current collector; and an active material containing-layer that is formed on the current collector and comprises active material particles containing at least one selected from a niobium titanium composite oxide and a composite oxide expressed by a general formula of $Li_xM1_{1-y}M2_yTi_{6-z}M3_zO_{14+\delta}$,
    wherein the active material particles comprise primary particles having an average particle diameter within a range of 0.1 μm to 10 μm and secondary particles having an average particle diameter within a range of 1 μm to 30 μm,
    a pore diameter distribution of the active material containing-layer obtained by mercury porosimetry has a first peak, which has a maximum value within a range of 0.01 μm to 2 μm, and a second peak which has a maximum value within a range exceeding 6 μm and equal to or smaller than 20 μm, and an intensity of the second peak is $1/10$ to $1/5$ an intensity of the first peak, (wherein, in the formula, M1 is at least one kind which is selected from a group consisting of Sr, Ba, Ca, and Mg, M2 is at least one kind which is selected from a group consisting of Cs, K and Na, M3 is at least one kind which is selected from a group consisting of Al, Fe, Zr, Sn, V, Nb, Ta and Mo, and
    x is within a range of $2 \leq x \leq 6$, y is within a range of $0 < y < 1$, z is within a range of $0 < z \leq 6$, and δ is within a range of $-0.5 \leq \delta \leq 0.5$).

2. The electrode according to claim 1, wherein the first peak has a maximum value within a range of 0.09 μm to 0.4 μm.

3. The electrode according to claim 1, wherein the intensity of the second peak is equal to or higher than $1/8$ the intensity of the first peak.

4. The electrode according to claim 1, wherein the average particle diameter of the primary particles is within a range of 0.5 μm to 5 μm, and the average particle diameter of the secondary particles is within a range of 3 μm to 15 μm.

5. The electrode according to claim 1, wherein the active material particles contain a titanium composite oxide having a monoclinic structure.

6. The electrode according to claim 1, wherein a density of the electrode is equal to or higher than 2.4 g/cm$^3$.

7. A nonaqueous electrolyte battery comprising:
a negative electrode which is obtained by using the electrode according to claim 1;
a positive electrode; and
a nonaqueous electrolyte.

8. A battery pack comprising the nonaqueous electrolyte battery according to claim 7.

9. The battery pack according to claim 8, further comprising:
an external power distribution terminal; and
a protective circuit.

10. A battery pack comprising nonaqueous electrolyte batteries, each of the nonaqueous electrolyte batteries comprising:
a negative electrode which is obtained by using the electrode according to claim 1;
a positive electrode; and
a nonaqueous electrolyte;
wherein the nonaqueous electrolyte batteries are connected in series, in parallel or with a combination of series connection and parallel connection.

11. An automobile comprising the battery pack according to claim 8, the battery pack being arranged in an engine room.

12. A vehicle comprising the battery pack according to claim 8.

13. The vehicle according to claim 12, wherein the battery pack is configured to recover a regenerative energy caused by a power of the vehicle.

* * * * *